United States Patent
Liu et al.

(10) Patent No.: US 9,462,472 B2
(45) Date of Patent: *Oct. 4, 2016

(54) SYSTEM AND METHOD FOR ESTABLISHING SECURITY IN NETWORK DEVICES CAPABLE OF OPERATING IN MULTIPLE FREQUENCY BANDS

(71) Applicant: Marvell World Trade LTD., St. Michael (BB)

(72) Inventors: Yong Liu, Santa Clara, CA (US); Paul A. Lambert, Mountain View, CA (US)

(73) Assignee: Marvell World Trade LTD., St. Michael (BB)

( * ) Notice: Subject to any disclaimer, the term of this patent is extended or adjusted under 35 U.S.C. 154(b) by 145 days.

This patent is subject to a terminal disclaimer.

(21) Appl. No.: 14/459,827

(22) Filed: Aug. 14, 2014

(65) Prior Publication Data

US 2015/0026453 A1  Jan. 22, 2015

Related U.S. Application Data

(63) Continuation of application No. 12/784,050, filed on May 20, 2010, now Pat. No. 8,812,833.

(60) Provisional application No. 61/294,705, filed on Jan. 13, 2010, provisional application No. 61/290,127, (Continued)

(51) Int. Cl.
*H04L 29/06* (2006.01)
*H04W 12/06* (2009.01)
(Continued)

(52) U.S. Cl.
CPC .......... *H04W 12/06* (2013.01); *H04L 63/0428* (2013.01); *H04L 63/08* (2013.01); *H04W 12/04* (2013.01); *H04W 88/06* (2013.01); *H04W 84/18* (2013.01)

(58) Field of Classification Search
CPC ... H04W 12/06; H04L 63/0428; H04L 63/08

USPC ......... 713/168–174, 182–186, 202; 709/225, 709/229; 726/2–8

See application file for complete search history.

(56) References Cited

U.S. PATENT DOCUMENTS

| 7,477,746 B2 | 1/2009 | Kang et al. |
| 7,995,546 B2 | 8/2011 | Walker et al. |

(Continued)

FOREIGN PATENT DOCUMENTS

| CN | 101300871 A | 11/2008 |
| CN | 101366292 A | 2/2009 |

(Continued)

OTHER PUBLICATIONS

The Notification Concerning Transmittal o f International Preliinary Report on Patentability (Chapter I of the Patent Cooperation Treaty) and Written Opinion of the International Searching Authority issued Jan. 12, 2012, in corresponding International Application No. PCT/US2010/039641; 7 pages.

(Continued)

*Primary Examiner* — Evans Desrosiers

(57) ABSTRACT

A Network device including a security module to establish, in response to the network device being capable of operating in multiple frequency bands, and in response to the network device operating in a first frequency band, security for the frequency band and a second frequency band by performing a single authentication in the first frequency band prior to the network device switching operation form the first frequency band to the second frequency band. A session transfer module to transfer, subsequent to the network device switching operation from the first frequency band to the second frequency band, a communication session of the network device from the first frequency band to the second frequency band. The communication session resumes in the second frequency band using the security established for the second frequency band during the operation of the network device in the first frequency band.

21 Claims, 31 Drawing Sheets

Related U.S. Application Data filed on Dec. 24, 2009, provisional application No. 61/264,200, filed on Nov. 24, 2009, provisional application No. 61/259,582, filed on Nov. 9, 2009, provisional application No. 61/255,035, filed on Oct. 26, 2009, provisional application No. 61/243,422, filed on Sep. 17, 2009, provisional application No. 61/219,924, filed on Jun. 24, 2009.

(51) Int. Cl.
  *H04W 12/04* (2009.01)
  *H04W 88/06* (2009.01)
  *H04W 84/18* (2009.01)

(56) References Cited

U.S. PATENT DOCUMENTS

| | | |
|---|---|---|
| 8,036,176 B2 | 10/2011 | Oba et al. |
| 8,560,848 B2 | 10/2013 | Liu et al. |
| 8,812,833 B2 | 8/2014 | Liu et al. |
| 8,813,201 B2 | 8/2014 | Lambert et al. |
| 9,071,416 B2 | 6/2015 | Liu et al. |
| 2004/0085945 A1 | 5/2004 | Takabatake et al. |
| 2006/0083200 A1 | 4/2006 | Emeott et al. |
| 2007/0067164 A1 | 3/2007 | Goudar |
| 2007/0081673 A1 | 4/2007 | Ren |
| 2007/0097934 A1 | 5/2007 | Walker et al. |
| 2007/0099669 A1 | 5/2007 | Sadri et al. |
| 2007/0106896 A1 | 5/2007 | Sandberg et al. |
| 2007/0121947 A1 | 5/2007 | Sood et al. |
| 2007/0160017 A1 | 7/2007 | Meier et al. |
| 2007/0192832 A1 | 8/2007 | Qi et al. |
| 2008/0003556 A1 | 1/2008 | Takahashi et al. |
| 2008/0016350 A1 | 1/2008 | Braskich et al. |
| 2008/0040777 A1* | 2/2008 | Aihara ............... H04L 12/14 726/4 |
| 2008/0084996 A1 | 4/2008 | Chen et al. |
| 2008/0240423 A1 | 10/2008 | Gueron et al. |
| 2008/0273696 A1 | 11/2008 | Greco et al. |
| 2008/0294897 A1 | 11/2008 | Patwardhan et al. |
| 2008/0298328 A1 | 12/2008 | Sharma |
| 2009/0019539 A1 | 1/2009 | Jonnalagadda et al. |
| 2009/0073945 A1 | 3/2009 | Seok |
| 2009/0161874 A1 | 6/2009 | Eun et al. |
| 2009/0241007 A1* | 9/2009 | Hong ............... H03M 13/356 714/752 |
| 2009/0262937 A1 | 10/2009 | Hirth et al. |
| 2009/0310775 A1 | 12/2009 | Gueron et al. |
| 2010/0042831 A1 | 2/2010 | Bahr et al. |
| 2010/0208896 A1 | 8/2010 | Goto |
| 2010/0284393 A1 | 11/2010 | Abraham et al. |
| 2010/0333185 A1 | 12/2010 | Lambert et al. |
| 2011/0075642 A1 | 3/2011 | Cordeiro et al. |

FOREIGN PATENT DOCUMENTS

| | | |
|---|---|---|
| EP | 1 515 510 A2 | 3/2005 |
| JP | 2000286866 A | 10/2000 |
| JP | 2008547257 A | 12/2008 |
| JP | 2009141588 A | 6/2009 |
| JP | 2010530159 A | 9/2010 |
| WO | WO-2007050949 A1 | 5/2007 |
| WO | WO-2007066959 A1 | 6/2007 |
| WO | WO-2007/111710 A2 | 10/2007 |
| WO | WO-2007120945 A2 | 10/2007 |
| WO | WO-2008/019942 A1 | 2/2008 |
| WO | WO-2008/112455 A2 | 9/2008 |
| WO | WO-2008153164 A2 | 12/2008 |
| WO | WO-2009008593 A1 | 1/2009 |
| WO | WO-2009114631 A1 | 9/2009 |

OTHER PUBLICATIONS

David A. McGrew and John Viega, "The Security and Performance of the Galois/Counter Mode (GCM) of Operation"; Oct. 7, 2004; 21 pages.

Housley et al., "GigaBeam High-Speed Radio Link Encryption; RFC 4705"; Oct. 2006.

IEEE Std 802.11-2007 (Revision of IEEE Std 802.11-1999); IEEE Standard for Information technology—Telecommunications and information exchange between systems—Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Jun. 12, 2007; 1232 pages.

Information technology—Telecommunications and information exchange between systems—local and metropolitan area networks—Specific requirements—Part 11: Wireless LAN Medium Access Control (MAC) and Physical layer {PHY) specifications: Amendment 6: Medium Access Control (MAC) Security Enhancements, ANSI/IEEE Std 802.11 i, 2004, Institute of Electrical and Electronics Engineers, Inc., New York, NY, USA.

Information technology—Telecommunications and information exchange between systems—Local and metropolitan area networks—Specific requirements—Part 11: Wireless LAN Medium Access Control (MAC) and Physical Layer (PHY) specifications, ANSI/IEEE Std 802.11, 1999, Institute of Electrical and Electronics Engineers, Inc., New York, NY, USA.

International Search Report and Written Opinion dated Apr. 13, 2011, in related PCT matter No. PCT/US2010/061746.

International Search Report for cooresponding International application No. PCT/US2010/046595; mailed Feb. 16, 2011.

International Search Report for International Application No. PCT/US2010/039641, dated Jan. 24, 2011.

Japanese Non-Final Reasons for Rejection for Application No. 2012-527912 dated Jun. 13, 2014; 4 Pages.

Japanese Notice of Reasons for Rejection dated Mar. 11, 2014 for Japanese Applicaiton No. 2012-517682; 2 Pages.

Japanese Office Action dated Mar. 18, 2014 for Japanese Application No. 2012-546188; 2 Pages.

Morris Dworkin, "Recommendation for Block Cipher Modes of Operation: Galois/Counter Mode (GCM) and GMAC", NIST Special Publication 800-380, Nov. 2007; 39 pages.

Ohyoung Song et al.: Hardware-software co-design of secure WLAN system for high throughput; Wireless Days (WD), 2009 2nd IFIP, IEEE, Piscataway, NJ, Dec. 15, 2009; pp. 1-5.

Patent Cooperation Treaty (PCT) International Search Report and Written Opinion, from co-pending PCT International Application No. PCT/US201 0/037706, International Filing Date Jun. 8, 2010 having a date of mailing of Jan. 25, D 2011 (12 pgs).

Shindou Sukekuni, Disclosure of Secure Communication Methods! Protection! Wireless LAN, Netowrk World, iDigi Japan, Aug. 1, 2004, vol. 9, No. 8; 19 Pages.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, ANSI/IEEE Std 802.11a, 1999, Institute of Electrical and Electronics Engineers, Inc., New York, NY, USA.

Winget, TGI Draft Comments 5.0, Aug. 2003, IEEE 802.11-3/657r0.

Henzen et al., "FPGA Implementation of a 2G Fibre Channel Link Encryptor with Authenticated Encryption Mode GCM," System-on-Chip, 2008. SOC 2008. International Symposium on 2008, pp. 1-4.

Satoh, A., High-Speed Hardware Architecutres for Authenticated Encryption Mode GCM, Circuits and Systems, 2006, ISCAS 2006. Proceedings. 2006 IEEE International Symposium on 2006; pp. 1-4.

U.S. Appl. No. 61/257,405, filed Nov. 2, 2009, Yong Liu.
U.S. Appl. No. 61/259,091, filed Nov. 6, 2009, Yong Liu.
U.S. Appl. No. 61/259,919, filed Nov. 10, 2009, Yong Liu.

* cited by examiner

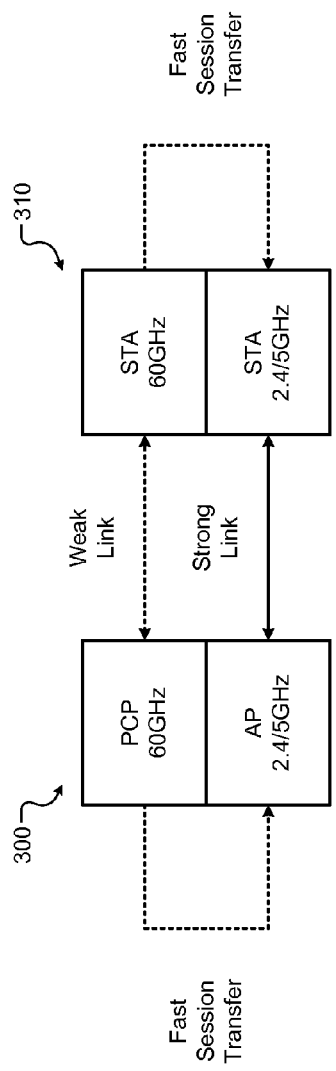
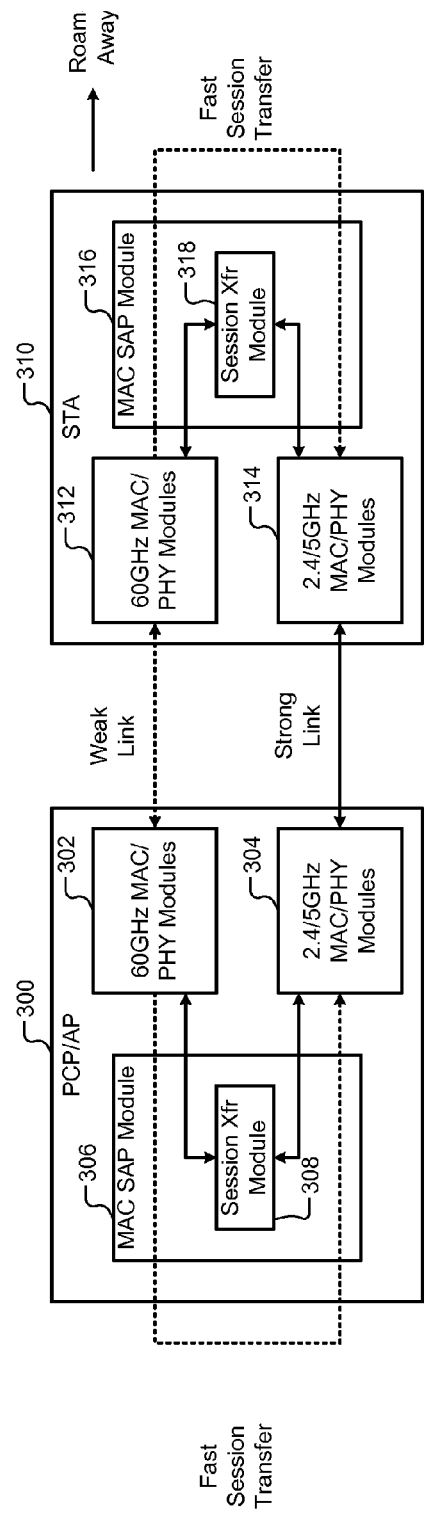
FIG. 3A
FIG. 3B

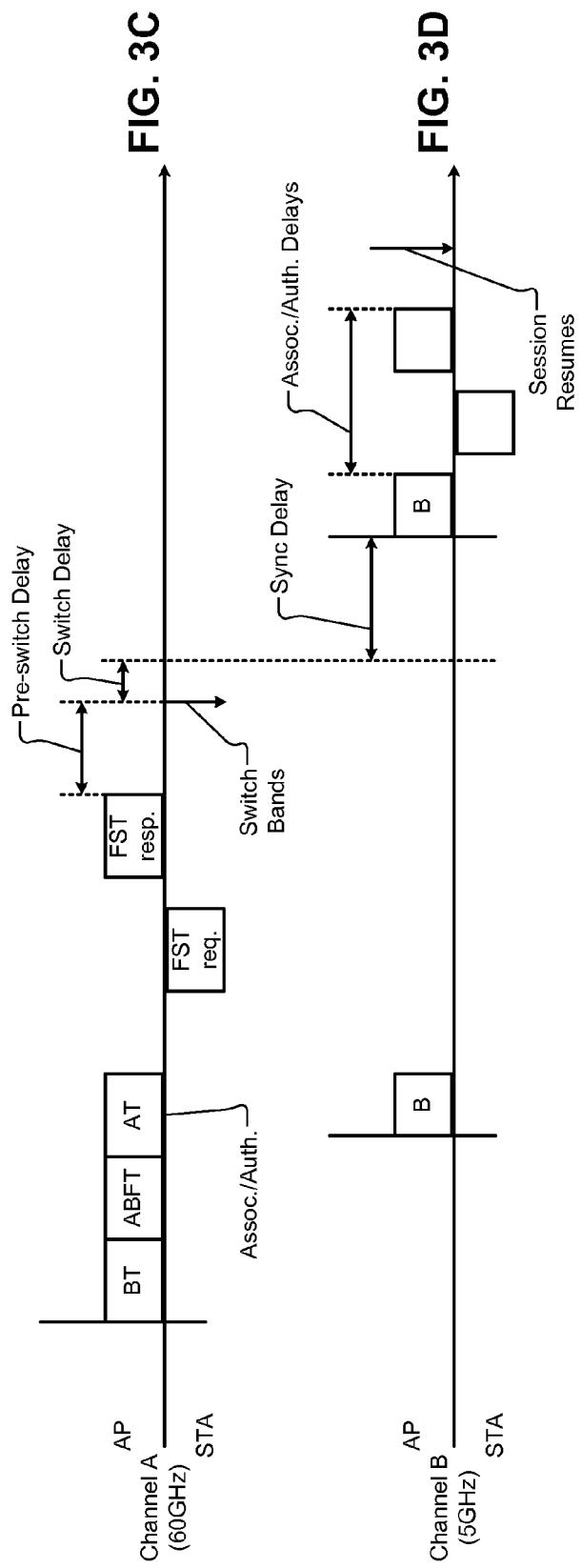

| MAC Address | Band ID |
|---|---|
| 6 Octets | 1 Octet |

FIG. 12B

| KeyID (0, 1, 2, Or 3) | TX | Reserved (0) | Band ID | GTK |
|---|---|---|---|---|
| Bits 0-1 | Bit 2 | Bits 3-7 | 1 Octet | (Length -6) Octets |

FIG. 12C

| KeyID | Reserved (0) | Band ID |
|---|---|---|
| Bits 0-1 | Bits 2-7 | Bits 8-15 |

| Protocol Version – 1 Octet | Packet Type – 1 Octet | Packet Body Length – 2 Octets |
|---|---|---|
| Descriptor Type – 1 Octet | | |
| Key Information – 2 Octets | Key Information – 2 Octets | |
| Key Replay Counter – 8 Octets | | |
| Key Nonce – 32 Octets | | |
| EAPOL-Key IV – 16 Octets | | |
| Key RSC – 8 Octets | | |
| Reserved – 8 Octets | | |
| Key MIC – 16 Octets | | |
| Key Data Length – 2 Octets | Key Data – n Octets | |

FIG. 12D

| B0 | B1 | B2 B3 B4 | B5 | B6 | B7 | B8 | B9 | B10 | B11 | B12 | B13 | B14 B15 |
|---|---|---|---|---|---|---|---|---|---|---|---|---|
| Key Descriptor Version | Key Type | Reserved | Install | Key Ack | Key MIC | Secure | Error | Request | Encrypted Key Data | SMK Message | Reserved | |

FIG. 12E

| | | Pre-Auth | Common AKM/PMKSA | PTKSA in Alien Band | Joint PTKSA |
|---|---|---|---|---|---|
| Different P/GMKSA for Different Bands | P/GMKSA in Associated Band P/GTKSA in Associated Band | 0 | 0 | 0 | 0 |
| | P/GMKSA in Operating Band P/GTKSA in Operating Band | 1 | 0 | 0 | 0 |
| | P/GMKSA in Operating Band P/GTKSA in Operating Band | 1 | 0 | 1 | 0 |
| Common P/GMKSA for All Bands | P/GTKSA in Associated Band | 1 | 1 | 0 | 0 |
| | P/GTKSA in Operating Band | 1 | 1 | 1 | 0 |
| | Joint P/GTKSA | 1 | 1 | 1 | 1 |

FIG. 16B

| Value | Meaning |
|---|---|
| 0 | Non-transparent switching supported |
| 1 | Both Non-transparent and Transparent switching Supported |

FIG. 17A

| | Multi-band RSNA Type |
|---|---|
| I: Initiator<br>R: Responder | |
| I: FST Mode = 1<br>R: FST Mode = 1 | Option 1: Transparent Only<br>Option 2: Either Transparent or Non-transparent |
| I: FST Mode = 1/0<br>R: FST Mode = 0/1 | Non-transparent Only |
| I: FST Mode = 0<br>R: FST Mode = 0 | Non-transparent Only |

FIG. 17B

SYSTEM AND METHOD FOR ESTABLISHING SECURITY IN NETWORK DEVICES CAPABLE OF OPERATING IN MULTIPLE FREQUENCY BANDS

CROSS-REFERENCE TO RELATED APPLICATIONS

This application is a continuation of U.S. patent application Ser. No. 12/784,050 (now U.S. Pat. No. 8,812,833), filed on May 20, 2010, which claims the benefit of U.S. Provisional Application No. 61/219,924, filed on Jun. 24, 2009, U.S. Provisional Application No. 61/243,422, filed on Sep. 17, 2009, U.S. Provisional Application No. 61/255,035, filed on Oct. 26, 2009, U.S. Provisional Application No. 61/259,582, filed on Nov. 9, 2009, U.S. Provisional Application No. 61/264,200, filed on Nov. 24, 2009, U.S. Provisional Application No. 61/290,127, filed on Dec. 24, 2009, and U.S. Provisional Application No. 61/294,705, filed on Jan. 13, 2010. The disclosures of the above applications are incorporated herein by reference in their entirety.

This application is related to U.S. application Ser. No. 14/053,109 filed on Oct. 14, 2013 which is a continuation of U.S. patent application Ser. No. 12/858,950 (now U.S. Pat. No. 8,560,848), filed on Aug. 18, 2010, which claims the benefit of U.S. Provisional Application Nos. 61/239,295, filed Sep. 2, 2009, 61/243,272, filed Sep. 17, 2009, and 61/244,787, filed Sep. 22, 2009. The disclosures of the above applications are incorporated herein by reference in their entirety.

FIELD

The present disclosure relates generally to wireless communications, and more particularly to security of multiband wireless communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The Institute of Electrical and Electronics Engineers (IEEE) has developed several 802.1X specifications that define security protocols to be followed by wireless communication devices. Wireless communication devices can exchange data securely when the security protocols are used to authenticate communications between the wireless communication devices.

SUMMARY

A network device includes a first physical layer (PHY) module, a second physical layer (PHY) module, and a security module. The first PHY module is configured to operate in a first frequency band. The second PHY module is configured to operate in a second frequency band. The security module is configured to establish security for the first frequency band responsive to the network device operating in the first frequency band. The security module is further configured to establish security for the second frequency band prior to the network device switching operation from the first frequency band to the second frequency band.

In other features, the systems and methods described herein are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 3A shows two multiband devices, each capable of operating in the 60 GHz frequency band and the 2.4/5 GHz frequency bands, communicating with each other;

FIG. 3B is a functional block diagram of the two multiband devices shown in FIG. 3A;

FIGS. 3C and 3D are timing diagrams showing session transfer between the two multiband devices shown in FIG. 3A;

FIG. 6A depicts a multiband robust security network (RSN) information element (IE);

FIG. 6B depicts a multiband RSN IE;

FIG. 6C depicts a multiband RSN IE;

FIG. 12A depicts a MAC address key data capsulation (KDE) with band IDs added;

FIG. 12B depicts a group temporal key (GTK) key KDE with band IDs added;

FIG. 12C depicts a Key ID KDE with band IDs added;

FIG. 12D depicts a EAPOL-Key frame used to indicate number of bands for a joint RSNA setup;

FIG. 12E depicts a key data capsulation (KDE) used to indicate number of bands for a joint RSNA setup;

FIG. 16B is a table of values that can be used to select a way of establishing multiband RSNA;

FIG. 17A depicts a fast session transfer (FST) mode field;

FIG. 17B is a table showing different FST modes in which an initiator and a responder can operate;

DESCRIPTION

Figure 1:
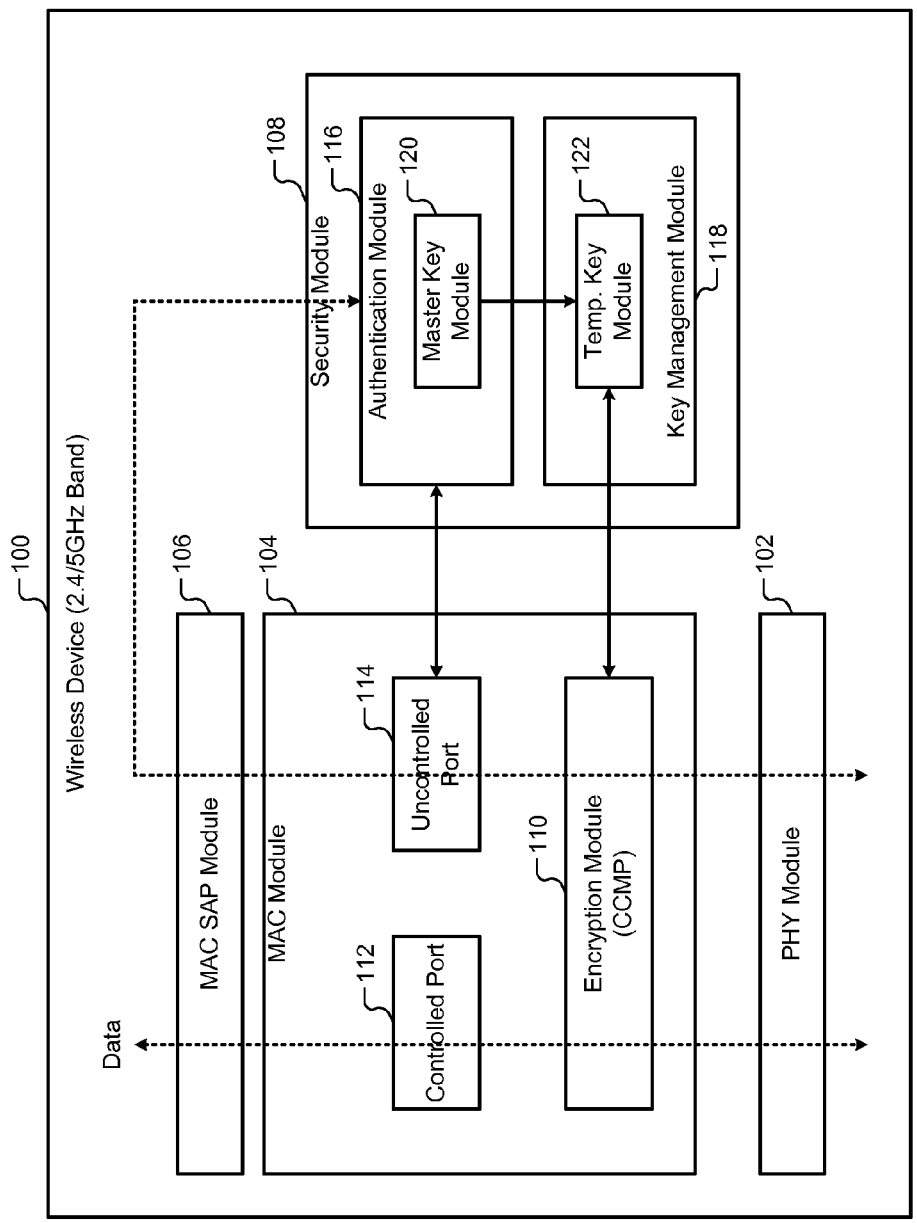
FIG. 1 is a functional block diagram of a wireless device that operates in 2.4/5 GHz frequency bands.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

A wireless device may be capable of communicating in multiple frequency bands. For example, an access point (AP) and a client station (STA) may communicate in a 60 GHz band via one radio link and in a 5 GHz band via another radio link. The AP and the STA may switch between the 60 GHz band and the 5 GHz band depending on factors including channel conditions on the radio links, quality of service requirements, and so on.

The radio links are typically connection-oriented and require establishment of both an association and a security configuration. The process of setting up security on a radio link after switching bands can degrade quality of service. The present disclosure relates to systems and methods of establishing secure communication channels on two or more radio links before switching bands.

Referring now to FIG. 1, a wireless device 100 capable of communicating in the 2.4 GHz band and the 5 GHz band is shown. The wireless device 100 includes a physical layer (PHY) module 102, a media access control (MAC) module 104, a MAC service access point (MAC SAP) module 106, and a security module 108.

The PHY module 102 interfaces the wireless device 100 to a wireless communication medium via one or more antennas (not shown) in the 2.4 GHz band and the 5 GHz band. The MAC module 104 controls access of the wireless device 100 to the wireless communication medium in the 2.4 GHz band and the 5 GHz band. The PHY module 102 and the MAC module 104 include components that enable wireless communication in the 2.4 GHz band and the 5 GHz band.

The MAC SAP module 106 routes data through the 2.4 GHz/5 GHz components of the PHY module 102 and the MAC module 104 when the wireless device communicates in the 2.4/5 GHz bands. The security module 108 manages security of data communicated by the wireless device 100 over the wireless communication medium.

The MAC module 104 includes an encryption module 110, a controlled port 112, and an uncontrolled port 114. The encryption module 110 encrypts data using counter mode (CTR) with cipher-block chaining (CBC)-MAC protocol (CCMP). In some implementations, the encryption module 110 may encrypt data using wired equivalent privacy (WEP) and/or temporal key integrity protocol (TKIP). The encryption module 110 may also encrypt data using Galois/Counter Mode Protocol (GCMP). The controlled port 112 is used to transport encrypted data securely when encryption is used. The uncontrolled port 114 is used to transport unencrypted data.

The security module 108 includes an authentication module 116 and a key management module 118. The authentication module 116 authenticates communications of the wireless device 100. The key management module 118 generates keys that the encryption module 110 uses to encrypt data.

The authentication module 116 includes a master key module 120. The master key module 120 obtains or generates a master key for a communication session of the wireless device 100 in the 2.4 GHz band and the 5 GHz band. For example, the master key module 120 generates a pairwise master key (PMK).

The term pairwise refers to two entities that want to communicate with each other (e.g., an access point (AP) and an associated client station (STA) in a basic service set (BSS), or two STAs in an independent BSS (IBSS) network). The term pairwise is used to refer to a type of encryption key hierarchy pertaining to keys shared by only two entities.

The key management module 118 includes a temporal key module 122. The temporal key module 122 generates a temporal key based on the master key. For example, the temporal key module 122 generates a pairwise transient key (PTK). The temporal key is derived from the master key. For example, the pairwise transient key (PTK) is derived from the pairwise master key (PMK). The encryption module 110 encrypts data using the temporal key.

More specifically, the temporal key module 122 derives the PTK from the PMK using a pseudo random function (PRF). That is, the PTK may be described as PRF(PMK). Further, PTK=KCK|KEK|TK. KCK is an EAPOL-Key confirmation key, where EAPOL denotes extensible authentication protocol over local area networks. KEK is an EAPOL-Key encryption key. TK is a temporal key.

Figure 2:
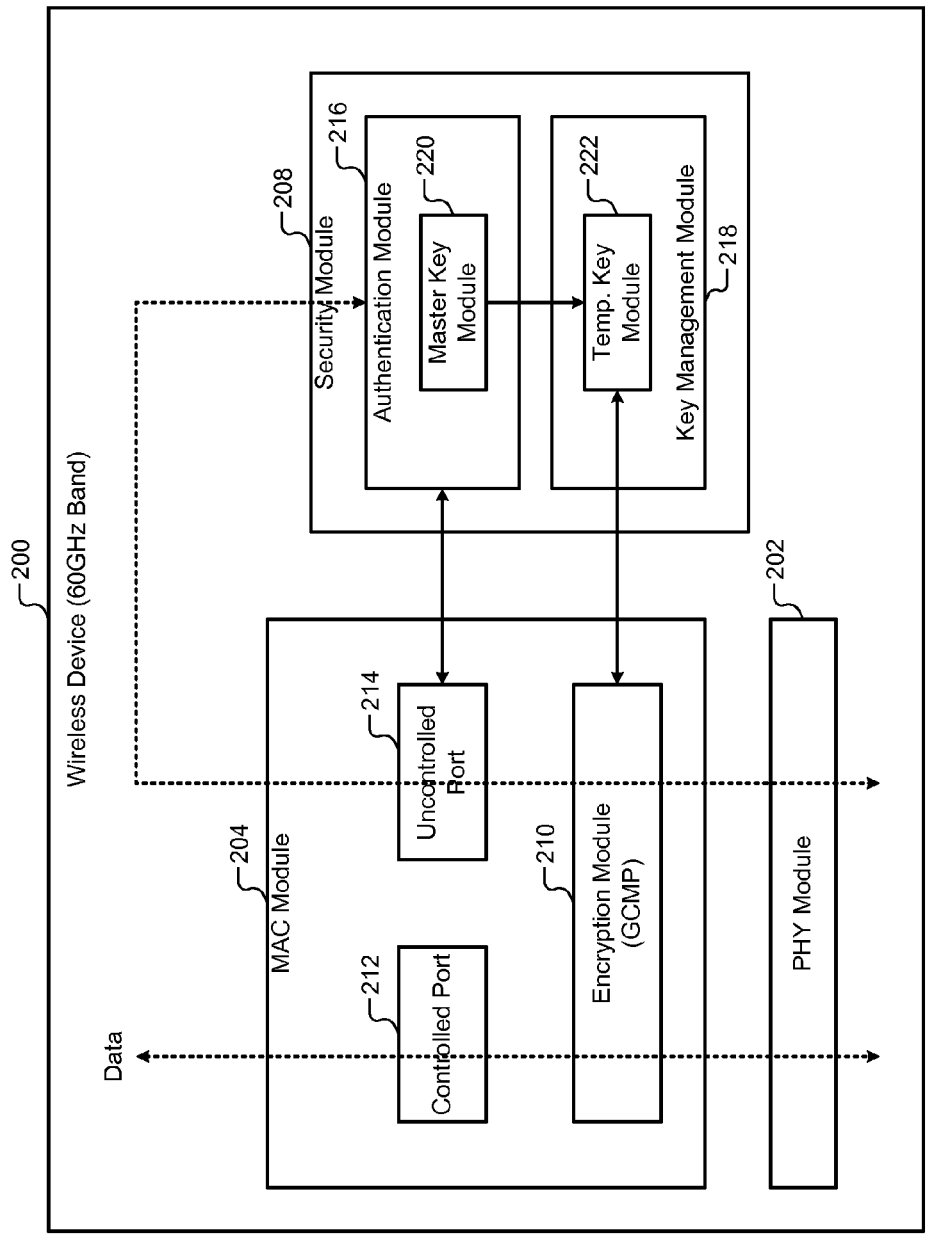
FIG. 2 is a is a functional block diagram of a wireless device that operates in a 60 GHz frequency band.

Referring now to FIG. 2, a wireless device 200 capable of communicating in a 60 GHz band according to specifications defined by the Wireless Gigabit Alliance (WGA) is shown. The wireless device 200 includes a PHY module 202, a MAC module 204, and a security module 208.

The PHY module 202 interfaces the wireless device 200 to the wireless communication medium via one or more antennas (not shown) in the 60 GHz band. The MAC module 204 controls access of the wireless device 200 to the wireless communication medium in the 60 GHz band. The security module 208 manages security of data communicated by the wireless device 200 over the wireless communication medium.

The MAC module 204 includes an encryption module 210, a controlled port 212, and an uncontrolled port 214. The encryption module 210 encrypts data using Galois/Counter Mode Protocol (GCMP). The controlled port 212 is used to transport encrypted data securely when encryption is used. The uncontrolled port 214 is used to transport unencrypted data.

The security module 208 includes an authentication module 216 and a key management module 218. The authentication module 216 authenticates communications of the wireless device 200. The key management module 218 generates keys that the encryption module 210 uses to encrypt data. GCMP is a different data confidentiality and integrity protection protocol from CCMP.

The authentication module 216 includes a master key module 220. The master key module 220 obtains or generates a master key (e.g., a pairwise master key (PMK)) for a communication session of the wireless device 200 in the 60 GHz band. The key management module 218 includes a temporal key module 222. The temporal key module 222 generates a temporal key (e.g., a pairwise transient key (PTK)) based on the pairwise master key (PMK). The encryption module 220 encrypts data using the temporal key.

Hereinafter, the 2.4 GHz band and the 5 GHz band will be referenced interchangeably. In other words, when the 2.4 GHz band or the 5 GHz band is used for example only, the description related to the 2.4 GHz band will also apply to the 5 GHz band and vice versa. Generally, the 60 GHz band may be called band 1, and the 2.4/5 GHz bands may be called band 2.

In the 60 GHz band, a basic service set (BSS) is called a personal BSS (PBSS). A PBSS includes a PBSS control point (PCP) and one or more STAs. The PCP and the STAs of the PBSS may be multiband devices capable of communicating in both the 60 GHz band and the 2.4/5 GHz bands.

In the 2.4/5 GHz bands, a BSS includes an AP and one or more STAs. A set of interconnected BSS's that appears as a single BSS to a logical link layer (LLC) at any STA associated with one of the BSS's is called an extended service set (ESS). The APs and the STAs of the ESS may be multiband devices capable of communicating in both the 60 GHz band and the 2.4/5 GHz bands.

Referring now to FIGS. 3A-3D, an AP/PCP 300 and a STA 310 are multiband devices. In FIG. 3A, the AP/PCP 300 and the STA 310 can communicate in a PBSS in the 60 GHz band. Additionally, the AP/PCP 300 and the STA 310 can communicate in an ESS in the 2.4/5 GHz bands. The AP/PCP 300 functions as a PBSS control point (PCP) in the 60 GHz band and as an AP in an ESS in the 2.4/5 GHz bands. The STA 310 functions as a STA in the PBSS in the 60 GHz band and in the ESS in the 2.4/5 GHz bands.

The 60 GHz band provides higher throughput but smaller range than the 2.4/5 GHz bands. Accordingly, the AP/PCP 300 and the STA 310 may switch between the 60 GHz band and the 2.4/5 GHz bands when the distance of the STA 310 from the AP/PCP 300 changes due to roaming.

In FIG. 3B, the AP/PCP 300 includes a 60 GHz MAC module and a 60 GHz PHY module collectively shown as 60 GHz MAC and PHY modules 302. Additionally, the AP/PCP 300 includes a MAC module and a PHY module capable of communicating in the 2.4/5 GHz bands, which are collectively shown as 2.4/5 GHz MAC and PHY modules 304. Further, the AP/PCP 300 includes a MAC SAP module 306 that includes a session transfer module 308.

The STA 310 includes a 60 GHz MAC module and a 60 GHz PHY module collectively shown as 60 GHz MAC and PHY modules 312. Additionally, the STA 310 includes a MAC module and a PHY module capable of communicating in the 2.4/5 GHz bands, which are collectively shown as 2.4/5 GHz MAC and PHY modules 314. Further, the STA 310 includes a MAC SAP module 316 that includes a session transfer module 318.

Hereinafter, the 60 GHz MAC and PHY modules 302, 312 are generally called the 60 GHz components 302, 312, and the 2.4/5 GHz MAC and PHY modules 304, 314 are generally called the 2.4/5 GHz components 304, 314. The AP/PCP 300 and the STA 310 utilize the 60 GHz components 302, 312 when communicating in the 60 GHz band (e.g., in channel A). The AP/PCP 300 and the STA 310 utilize the 2.4/5 GHz components 304, 314 when communicating in the 2.4/5 GHz bands (e.g., in channel B).

Initially, the AP/PCP 300 and the STA 310 may communicate in Band x/channel A. Subsequently, the STA 310 may roam away from the AP/PCP 300. Accordingly, the link between the AP/PCP 300 and the STA 310 in Band x/channel A may become weak, and the AP/PCP 300 and the STA 310 may switch from the link in Band x/channel A to a link in Band y/channel B.

The MAC SAP modules 306, 316 determine when to switch from the 60 GHz band to 2.4/5 GHz bands. The MAC SAP modules 306, 316 route data through the 60 GHz components 302, 312 when communicating in the 60 GHz band. The MAC SAP modules 306, 316 route data through the 2.4/5 GHz components 304, 314 when communicating in the 2.4/5 GHz bands. The session transfer modules 308, 318 switch the link of the AP/PCP 300 and the STA 310 from Band x/channel A to Band y/channel B when bands are switched as shown in FIGS. 3C and 3D.

In FIG. 3C, the AP/PCP 300 and the STA 310 may initially communicate in Band x/channel A. The STA 310 may associate with the AP/PCP 300 by exchanging association frames in channel A. Further, the STA 310 and the AP/PCP 300 may establish security association and negotiate quality of service (QOS) before a session in channel A is established. Once the session is established, the AP/PCP 300 and the STA 310 exchange data in channel A.

When the link between the AP/PCP 300 and the STA 310 in channel A becomes weak, the STA 310 sends a fast session transfer (FST) request to the AP/PCP 300. The AP/PCP 300 responds with a FST response. The MAC SAP modules 306, 316 switch from 60 GHz band to one of the 2.4/5 GHz bands. The session transfer module 308, 318 transfer the session from channel A to channel B.

In FIG. 3D, after switching to the 2.4/5 GHz bands, the STA 310 and the AP/PCP 300 exchange association frames. Additionally, since the 2.4/5 GHz bands may use different data protection protocol than the 60 GHz bands, the STA 310 and the AP/PCP 300 may establish new security association and negotiate QOS before the session can be resumed in channel B. Once the session resumes in channel B, the AP/PCP 300 and the STA 310 resume exchanging data in channel B.

When switching bands, several delays can occur before a session in a current band can be resumed in a new band. For example, the delays may include a delay before switching bands (pre-switching delay), a delay during switching bands (switching delay), and a post-switching delay. The post-switching delay may include a synchronization (sync) delay and delays due to association, authorization (i.e., establishment of security on the new channel), and negotiation of QOS in the new band. The delays may slow the process of session transfer and may disrupt service.

In order to achieve fast and seamless session transfer when switching bands, the association, authentication, and QOS negotiation for the new band may be performed in the current band before switching bands. Preferably, the association, authentication, and QOS negotiation may be performed in the current band once for all bands when a multiband device initially joins a network (a PBSS or an ESS).

For example, the STA 310 may initially associate with the AP/PCP 300 in the 60 GHz band. When performing authentication and key creation for the 60 GHz band, the STA 310 and the AP/PCP 300 may also perform authentication and key creation for the 2.4/5 GHz bands when operating in the 60 GHz band. Accordingly, performing authentication and key creation for the 2.4/5 GHz bands when bands are switched from the 60 GHz band to the 2.4/5 GHz bands is obviated. Thus, the delays associated with performing authentication on the 2.4/5 GHz bands when bands are switched from the 60 GHz band to the 2.4/5 GHz bands are eliminated.

Three different approaches may be used to perform authentication and key creation in the current band for one or more alien bands when a multiband device initially joins a network or before the device is about to switch. The three approaches are a multi-transient-key approach, a single-transient-key approach, and a hybrid approach. Each approach is discussed below in turn.

A complete security or RSNA setup includes the following steps: (1) RSNA capabilities and policies advertisement or inquiry; (2) Association; (3) RSNA authentication resulting in PMKSA setup (i.e., creating PMK); and (4) a 4-Way handshake resulting in PTKSA setup (i.e., creating PTK).

Figure 4:
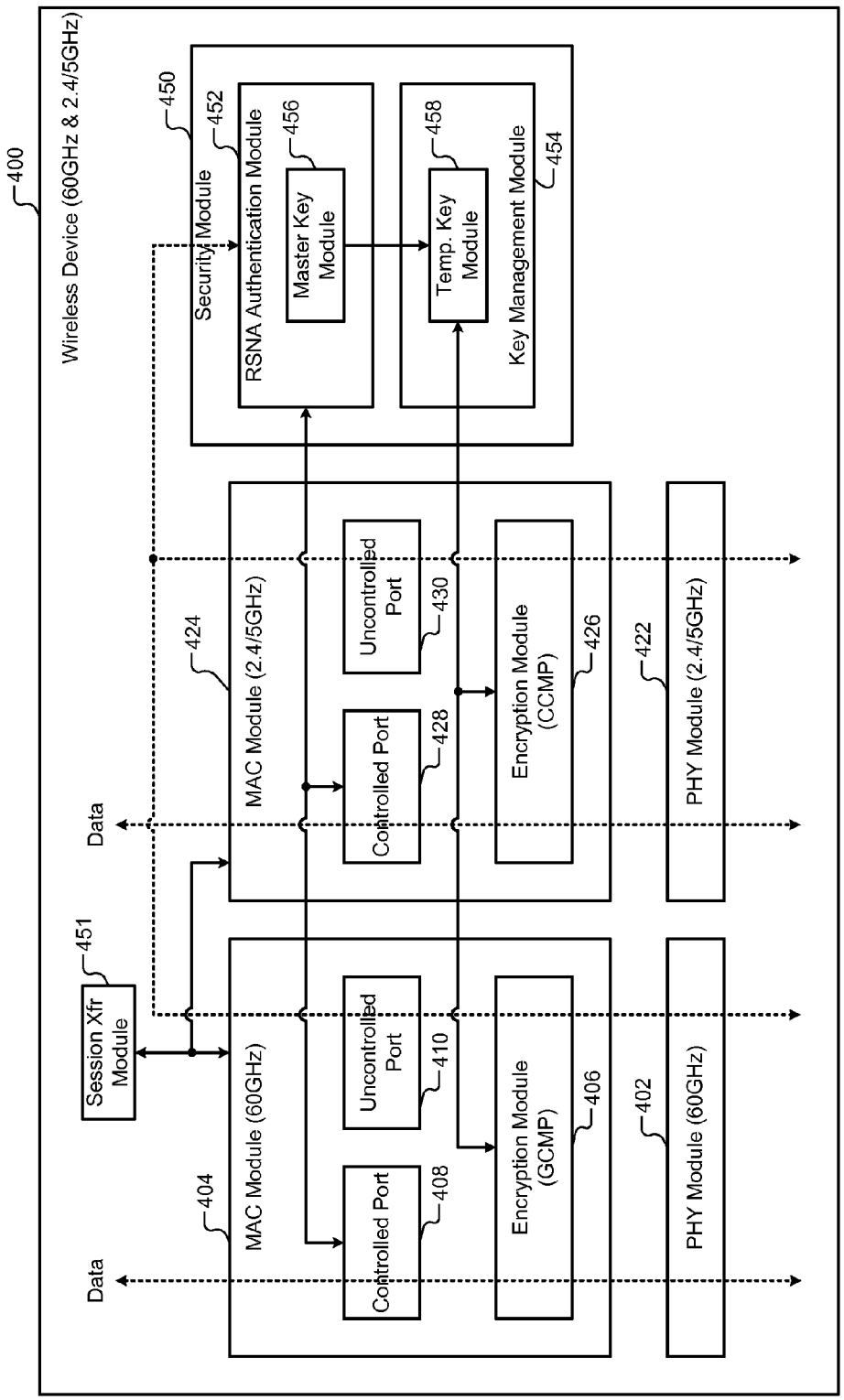
FIG. 4 is a functional block diagram of a multiband wireless device capable of operating in the 60 GHz frequency band and the 2.4/5 GHz frequency bands.

Referring now to FIG. 4, a wireless device 400 is a multiband device that can communicated in the 60 GHz band and in the 2.4/5 GHz bands. The wireless device 400 uses the multi-transient-key approach to perform authentication and key management.

The wireless device 400 includes a 60 GHz PHY module 402 and a 60 GHz MAC module 404 (collectively 60 GHz components 402, 404). The 60 GHz MAC module 404 includes a GCMP encryption module 406, a controlled port 408, and an uncontrolled port 410. The wireless device 400 further includes a 2.4/5 GHz PHY module 422 and a 2.4/5 GHz MAC module 424 (collectively 2.4/5 GHz components 422, 424). The 2.4/5 GHz MAC module 424 includes a CCMP encryption module 426, a controlled port 428, and an uncontrolled port 430. The CCMP encryption module 426 is shown for example only. The 2.4/5 GHz MAC module 424 can alternatively or additionally include a GCMP encryption module.

Additionally, the wireless device 400 includes a security module 450 that performs authentication and establishes security associations. The wireless device 400 includes a session transfer module 451 that transfers sessions from one band to another (e.g., from the 60 GHz band to the 2.4/5 GHz bands) after the security module 450 establishes performs authentication and establishes security association for the other band in the current band. In some implementations, the session transfer module 451 may perform multiband security functions such as establishing security for the other band in the current band.

The security module 450 includes a robust security network association (RSNA) authentication module 452 and a key management module 454. The RSNA authentication module 452 includes a master key module 456. The key management module 454 includes a temporal key module 458. RSNA is a type of association used by a pair of wireless devices (e.g., STAs) if the procedure to establish authentication or association between them includes a 4-way handshake described below. RSNA is a general term of security relationship and includes authentication and security association. Authentication usually leads to the creation of master key. Security association usually includes a 4-Way Handshake and leads to the creation of temporal key.

When the wireless device 400 joins a PBSS or an ESS, the security module 450 performs authentication for the 60 GHz band as well as the 2.4/5 GHz bands using the multi-transient-key approach. In the multi-transient-key approach, only one authentication is performed for all bands and one master key is created for all bands while each band uses a different temporal key. That is, all bands use a single master key while N temporal keys are used for N bands, respectively, where N is an integer greater than 1.

The RSNA authentication module 452 performs authentication in the current band once for all bands. The master key module 456 generates only one pairwise master key (PMK), and only one pairwise master key security association (PMKSA) is established for all bands. The pairwise master key (PMK) may be obtained from the preshared key (PSK). One preshared key (PSK) is used for all bands.

Additionally, the master key module 456 generates only one group master key (GMK). The GMK is an auxiliary key that may be used to derive a group temporal key (GTK) described below. The same pairwise master key (PMK) and the same group master key (GMK) are shared by all bands.

The temporal key module 458 generates a different temporal key (e.g., a pairwise transient key or PTK) for each band based on the same master key. For example, the temporal key module 458 generates $PTK_{60}$ for the 60 GHz band and $PTK_{2.4/5}$ for the 2.4/5 GHz bands based on the same pairwise master key (PMK) as follows.

The temporal key module 458 derives $PTK_{60}$ (i.e., pairwise transient key (PTK) for the 60 GHz band) and $PTK_{2.4/5}$ (i.e., PTK for the 2.4/5 GHz bands) from the same pairwise master key (PMK) using a pseudo random function (PRF). $PTK_{60}$ may be described as PRF(PMK, $Nonces_{60}$, $Addresses_{60}$, etc.), where a nonce is a numerical value that is not to be reused once used with a key. Further, $PTK_{60}=KCK_{60}|KEK_{60}|TK_{60}$. Additionally, $PTK_{2.4/5}$ may be described as PRF(PMK, $Nonces_{2.4/5}$, $Addresses_{2.4/5}$, etc.), and $PTK_{2.4/5}=KCK_{2.4/5}|KEK_{2.4/5}|TK_{2.4/5}$.

A pairwise transient key security association (PTKSA) is established for each band using a PTK. A group temporal key security association (GTKSA) is established for each band using a group temporal key (GTK). The encryption module 210 uses $PTK_{60}$ to encrypt data when the wireless device 400 communicates on the 60 GHz band. The encryption module 110 uses $PTK_{2.4/5}$ to encrypt data when the wireless device 400 communicates on the 2.4/5 GHz bands. The PTKSA and GTKSA for each band use respective packet number (PN) counters during encryption.

For each band, when the PTK and the GTK are generated and stored in the encryption module, the MAC module of a band unblocks the controlled port of the band to securely transport encrypted data when the PTK and the GTK are generated and stored in the encryption module of the band.

Figure 5:
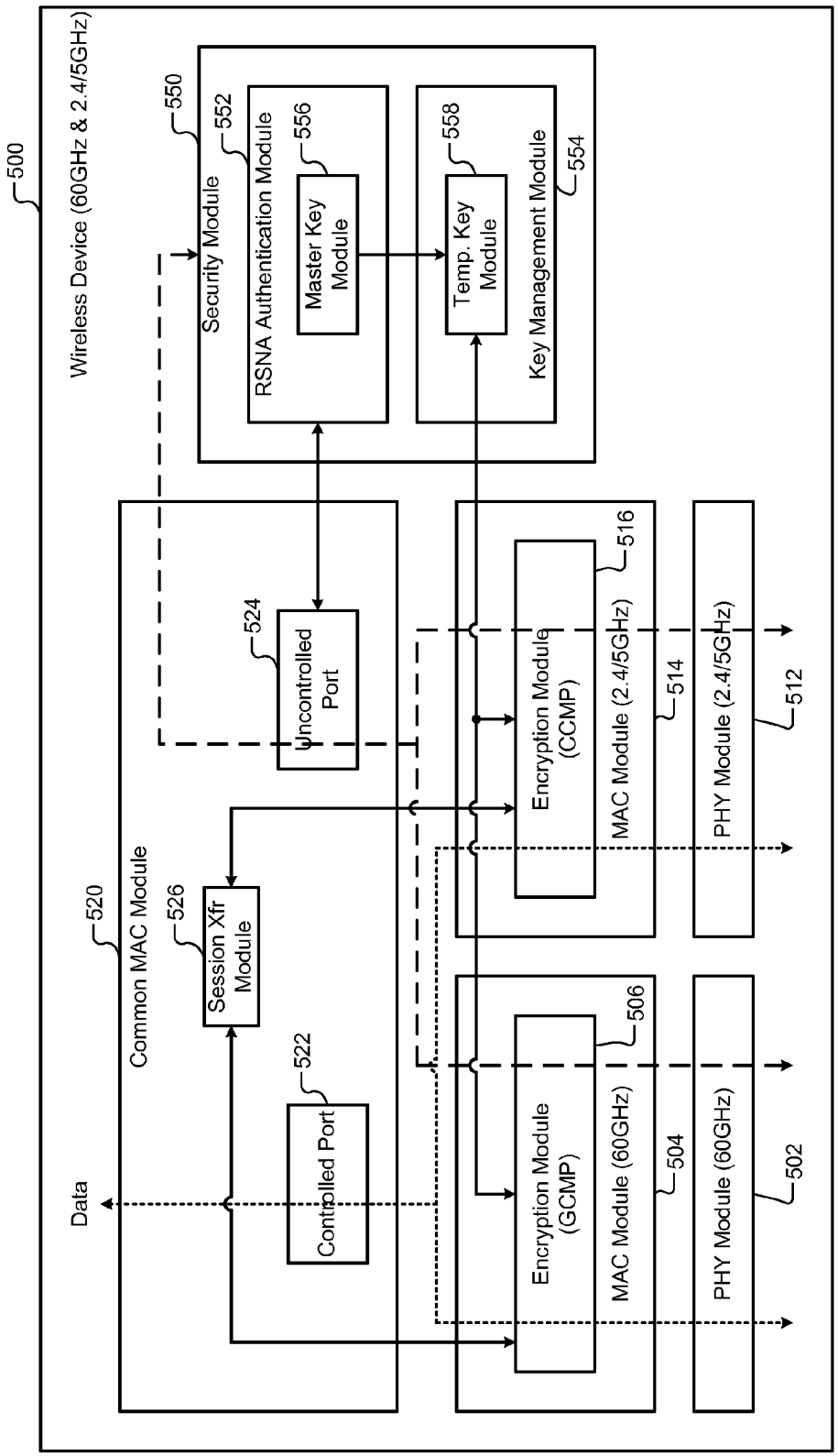
FIG. 5 is a functional block diagram of a multiband wireless device that includes a common MAC and that operates in the 60 GHz frequency band and the 2.4/5 GHz frequency bands.

Referring now to FIG. 5, a wireless device 500 is a multiband device that can communicated in the 60 GHz band and in the 2.4/5 GHz bands. The wireless device 500 uses the single-transient-key approach to perform authentication.

The wireless device 500 includes a 60 GHz PHY module 502 and a 60 GHz MAC module 504 (collectively 60 GHz components 502, 504). The 60 GHz MAC module 504 is a lower layer MAC module in the hierarchy of the Open System Interconnection (OSI) Reference Model. The 60 GHz MAC module 504 includes a GCMP encryption module 506.

The wireless device 500 further includes a 2.4/5 GHz PHY module 512 and a 2.4/5 GHz MAC module 514 (collectively 2.4/5 GHz components 512, 514). The 2.4/5 GHz MAC module 514 is a lower layer MAC module in the hierarchy of the OSI Reference Model and includes a CCMP encryption module 516.

Further, the wireless device 500 includes a MAC module 520 that is common to the 60 GHz band and the 2.4/5 GHz bands. The MAC module 520 is a higher layer MAC module in the hierarchy of the OSI Reference Model. The MAC module 520 includes a controlled port 522 and an uncontrolled port 524. The controlled port 522 transports encrypted data in the 60 GHz band and in the 2.4/5 GHz bands. The uncontrolled port 524 transports unencrypted data in the 60 GHz band and in the 2.4/5 GHz bands.

The MAC module 520 includes a session transfer module 526 that transfers sessions from one band to another (e.g., from the 60 GHz band to the 2.4/5 GHz bands) after security and authentication for the other band is performed in the current band.

The wireless device 500 includes a security module 550 that performs authentication and establishes security association. The security module 550 includes a robust security network association (RSNA) authentication module 552 and a key management module 554. The RSNA authentication module 552 includes a master key module 556. The key management module 554 includes a temporal key module 558.

When the wireless device 500 joins a PBSS or an ESS, the security module 550 performs authentication for the 60 GHz band as well as the 2.4/5 GHz bands using the single-transient-key approach. In the single-transient-key approach, only one master key and only one temporal key are used for all bands. That is, all bands use the same master key and the same temporal key.

The RSNA authentication module 552 performs authentication in the current band once for all bands. The master key module 556 generates only one pairwise master key (PMK), and only one pairwise master key security association (PMKSA) is established for all bands. The master key module 556 generates only one group master key (GMK). The same pairwise master key (PMK) and the same group master key (GMK) are shared by all bands.

The temporal key module 558 generates only one temporal key (e.g., a pairwise transient key or PTK) for all bands based on the same master key. For example, the temporal key module 558 generates a single PTK for the 60 GHz band and the 2.4/5 GHz bands based on the same pairwise master key (PMK) as follows.

The temporal key module 558 derives the single pairwise transient key (PTK) from the same pairwise master key (PMK) using a pseudo random function (PRF). PTK may be described as PRF(PMK, Nonces, Addresses, etc.). Further, PTK=KCK|KEK|TK. Only one pairwise transient key security association (PTKSA) is established for all bands using the PTKs. Only one group temporal key security association (GTKSA) is established for all bands using a single group temporal key (GTK).

The same pairwise transient key (PTK) and the same group temporal key (GTK) are shared by all bands. If different bands have different MAC addresses, the single pairwise transient key (PTK) is derived based on the MAC address of the band that is actually used to perform a 4-way handshake to establish security in the current band. The single group temporal key (GTK) may be derived from the MAC address of the currently used band or any band that may be used after switching bands.

The GCMP encryption module 506 uses the pairwise transient key (PTK) to encrypt data when the wireless device 500 communicates on the 60 GHz band. The CCMP encryption module 516 uses the same PTK to encrypt data when the wireless device 500 communicates on the 2.4/5 GHz bands. During encryption, one packet number (PN) counter is shared by all bands for the pairwise transient key security association (PTKSA) and another PN counter is shared by all the bands for the group temporal key security association (GTKSA).

For each band, when the PTK and the GTK are generated and stored in the encryption modules 506 and/or 516, The MAC module 520 unblocks the controlled port 522 to securely transport encrypted data when the PTK and the GTK are generated and stored in the encryption modules 506 and/or 516. The controlled port 522 and the uncontrolled port 524 are shared by all bands.

The third approach for performing authentication is called the hybrid approach. The hybrid approach uses a hybrid of the single-transient-key approach and the multi-transient-key approach depending on a multiband mode of the multiband device. Generally, the multiband devices may be configured to operate in one of two multiband modes: a transparent mode or a non-transparent mode.

In the transparent mode, the multiband device is configured to include a common higher layer MAC for all bands and different lower layer MACs for each band. Accordingly, all bands share the same MAC address of the common higher layer MAC. Since all bands share the same MAC address, the single-transient-key approach is used to perform authentication and establish security association.

In the non-transparent mode, the multiband device is configured to include a different MAC address for each band. Accordingly, each band has a different MAC address. Since different bands have different MAC addresses, the multi-transient-key approach is used to perform authentication and establish security association. The transparent mode and non-transparent mode are discussed in detail later.

Before discussing the multi-transient-key approach in detail, advertising RSN security capabilities and policies is briefly described. A detailed description of advertising RSN security capabilities and policies is provided after the detailed discussion of transparent mode and non-transparent mode.

Multiband devices may use different security suites for different bands. To establish RSNA, the multiband devices advertise RSN security capabilities and policies. Multiband devices may advertise multiband RSN security capabilities and policies using one of the following options.

In option 1, one RSN information element (IE) is used per band, and a band ID is appended to the RSN IE for the respective band. For example, a Band ID of an alien band is appended to the RSN IE for the alien band. In option 2, a security suite list or field (e.g. pairwise cipher suite) is added to a multiband IE to indicate the security suite(s) that can be used in the alien band.

In option 3, instead of using one RSN IE per band, a single RSN IE is used. For example, a multiband security suite list or field is added to the RSN IE to indicate the security suite(s) that can be used in the alien band(s) or all bands. In the following discussion, wherever one of these options is mentioned, it should be understood that any of the other options may be utilized instead.

Referring now to FIGS. 6A-6C and FIG. 4, the multi-transient-key approach is described in further detail. Only one (i.e., a single) pairwise master key security association (PMKSA) is established for all bands. The same pairwise master key (PMK) and the same group master key (GMK) are shared by all bands. Different pairwise transient key security associations (PTKSAs) and group temporal key security associations (GTKSAs) are established for different bands.

Figures 6A, 6B, 6C:
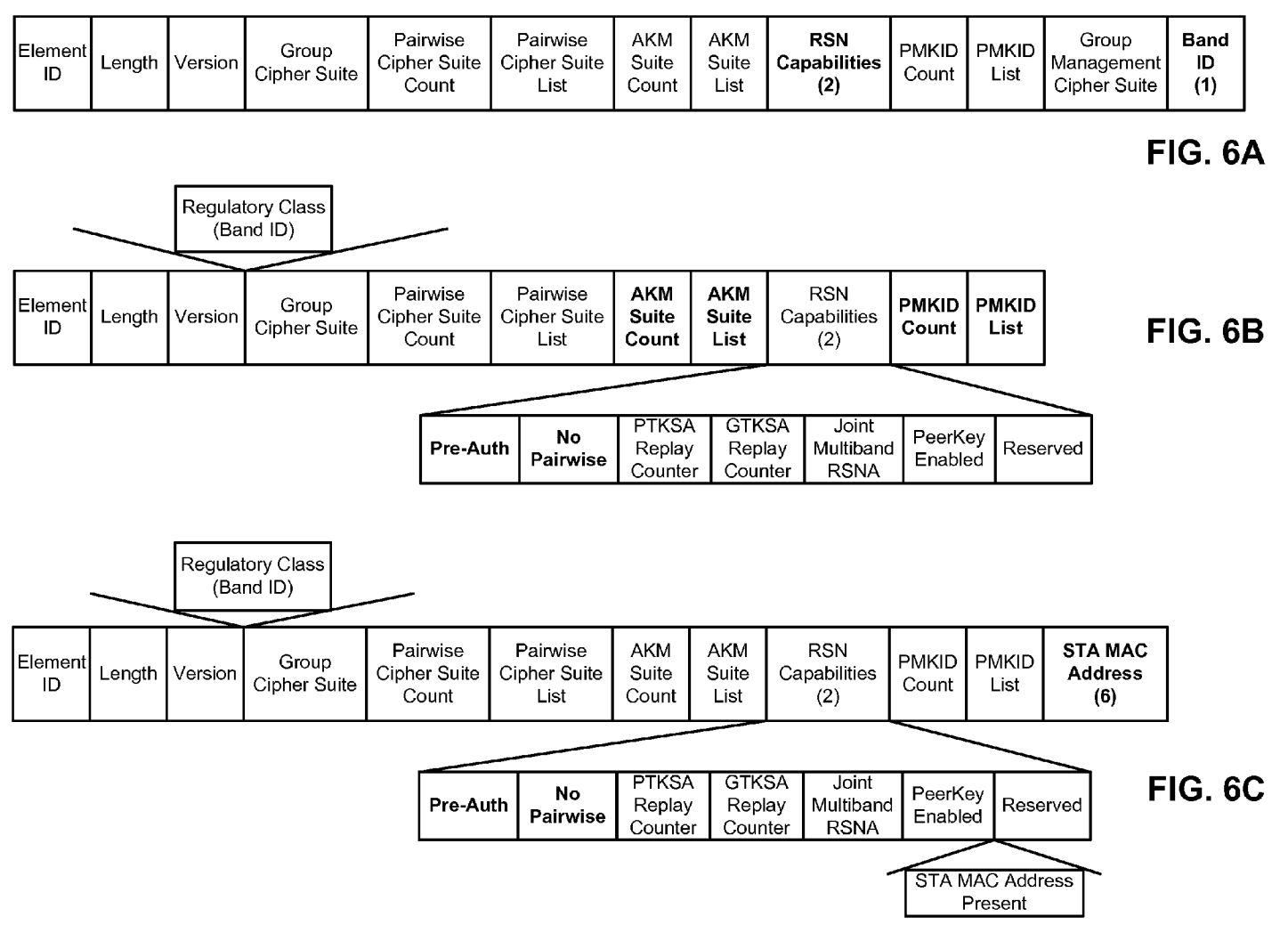

In FIG. 6A, a robust security network (RSN) information element (IE) is shown. The wireless device 400 shown in FIG. 4 advertises the RSN IE to other wireless devices. A Band ID field is newly added to the RSN IE. The RSN capabilities field is modified. The newly added Band ID field and the modified RSN capabilities field are shown highlighted. Alternatively, other ways of advertising multiband RSNA capabilities described above may be utilized.

The RSN IE may be advertised via a beacon, a probe request, or a probe response frame by the AP/PCP or when the wireless device 400 initially joins a PBSS or an ESS on one of the bands. When communicating with another wireless device, the security module 450 of the wireless device 400 receives the RSN IE from the other device. The security module 450 uses the information in the Band ID field and the RSN capabilities field to establish security (i.e., to perform authentication and establish security association) for one or multiple bands.

The band ID field (1 octet) is added in the RSN IE to indicate the band associated with the RSN IE. For example, a band ID of 0 may denote the 2.4/5 GHz band, and a band ID of 1 may denote the 60 GHz band. Additionally, a joint multiband robust security network association (RSNA) subfield is included in the RSN capabilities field. The joint multiband RSNA subfield indicates if joint multiband RSNA capability is enabled.

For multi-transient-key approach, the security module 450 can establish the pairwise transient key security association (PTKSA) and group temporal key security association (GTKSA) for another band while establishing the PTKSA and the GTKSA for the current band. If the joint multiband RSNA capability is enabled, the security module 450 can use a single 4-way handshake to establish the PTKSAs and the GTKSAs for all bands (i.e., the current band and all other bands) in the current band.

In FIG. 6B, a multiband robust security network (RSN) information element (IE) is shown. In multi-transient-key approach, since a single master key is used for all bands, the highlighted fields are not useful. Accordingly, the highlighted fields can be set the same as those in the RSN IE of the current band. Alternatively, the highlighted fields can be deleted or used for other purposes.

In FIG. 6C, another multiband RSN IE is shown. For non-transparent mode, since different bands use different MAC addresses, the MAC address of the new band may be included in the RSN IE (e.g., STA MAC address shown highlighted). The security module 450 uses the MAC address of the new band to generate a pairwise transient key (PTK) for the new band when operating in the current band. Alternatively, the MAC address of the new band may be communicated in other ways.

Generally, a security module of a wireless device is part of a station management entity (SME) of the wireless device. The SME manages the security and authentication of the wireless device. For example, in FIG. 4, the security module 450 of the wireless device 400 may implement a SME of a STA/AP when the wireless device 400 is a STA/AP.

When a STA can communicate in multiple bands and is capable of robust security network association (RSNA), the SME of the STA may include a RSN IE, multiband IEs, and multiband RSN IEs associated with supported bands. Alternatively, other ways of advertising multiband RSNA capabilities described above may be utilized. The SME may include these IEs in a beacon, a millimeter wave beacon (mmWave beacon), and/or Announce frames. Additionally, the SME includes these IEs in probe response and information response frames.

When the SME of the STA wants to setup a robust security network association (RSNA) with a peer STA for a supported band other than the current band, but does not know a security policy of the peer STA for the supported band, the SME first obtains the security policy and capabilities using a probe request frame or information request frame.

Multiband authentication is now described in detail. Specifically, when the SME of the STA wants to set up a RSNA with the peer STA for a supported band other than the current operating band, if the STA does not have an existing pairwise master key security association (PMKSA) with the peer STA, the STA first establishes a PMKSA with the peer STA in the current band by performing RSNA authentication. To establish the PMKSA, if the STA does not have a PMK, the STA generates a PMK that is independent of all bands. After establishing the PMKSA, the STA uses the PMKSA to create a pairwise transient key security association (PTKSA) with the peer STA for the supported band.

If the STA has already established a pairwise master key security association (PMKSA) with the peer STA, the PMKSA is used to create a pairwise transient key security association (PTKSA) between the two STAs for the supported band. A single group master key security association (GMKSA) is used for all supported bands.

RSNA setup is now described in detail. Generally, in the authentication process, a supplicant is an entity at one end of a point-to-point local area network (LAN) segment that is being authenticated by an authenticator attached to the other end of the LAN segment. The supplicant and the authenticator can be the two entities referenced by the term pairwise.

Figure 7:
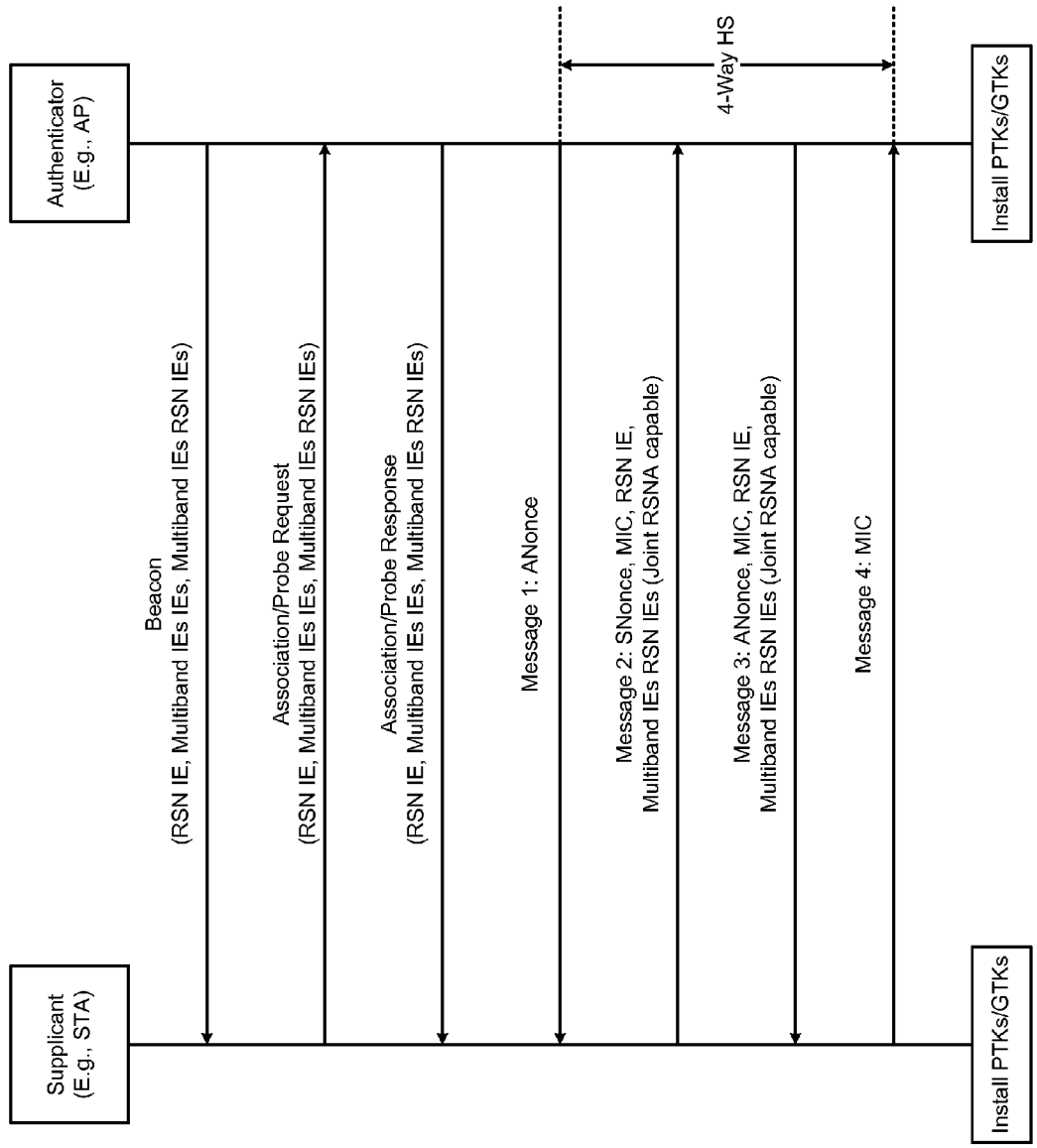
FIG. 7 depicts a joint multiband robust security network association (RSNA) between a supplicant and an authenticator using a 4-way handshake.

Referring now to FIG. 7, a supplicant and an authenticator may exchange capabilities, perform authentication, and establish PTKSA for multiple bands as follows. For example only, the supplicant may be a client station (STA), and the authenticator may be an access point (AP). Alternatively, when two STAs communicate with each other, one STA can be the supplicant while the other STA can be the authenticator or vice versa.

The STA and the AP can communicate in multiple bands and are capable of robust security network association (RSNA). The STA and the AP exchange association frames to associate in a current band. RSNA authentication is usually conducted after association and 4-Way handshake.

Before association, the STA may receive a beacon from the AP that includes a robust security network information element (RSN IE), multiband information elements (IEs), and multiband RSN IEs associated with the bands in which the AP can operate. The STA may also actively send association/probe requests to the AP that include a RSN IE, multiband IEs, and multiband RSN IEs associated with the bands in which the STA can operate. In response, the AP may send association/probe response including a RSN IE, multiband IEs, and multiband RSN IEs associated with the bands in which the STA can operate. Once the STA and the AP find out each other's RSNA policies and capabilities in both the current band and other bands, the STA and the AP can establish security for the allowed bands using a 4-way handshake conducted in the current band. The 4-way handshake is conducted by the STA and the AP as follows.

For example, the 4-way handshake is conducted by the station management entities (SMEs) (e.g., security modules) of the STA and the AP. The 4-way handshake is conducted in the current band to negotiate a pairwise cipher suit for the supported band. Additionally, the 4-way handshake is conducted in the current band to establish a pairwise transient key security association (PTKSA) and a group temporal key security association (GTKSA) for the supported band.

The 4-way handshake is a pairwise key management protocol that confirms mutual possession of a pairwise master key (PMK) by two entities and that distributes a group temporal key (GTK). A cipher suit is a set of one or more algorithms for providing data confidentiality, data authenticity or integrity, and so on. The cipher suite includes elements used by the supplicant and the authenticator to encrypt data in a supported band. The RSN IE, multiband IE and/or multiband RSN IE include the cipher suites supported in the current band and other supported bands.

As shown in FIG. 7, the 4-way handshake includes an exchange of four messages between the supplicant and the authenticator. In a first implementation, the STA and the AP may initially perform RSNA setup for the current band by conducting RSNA authentication and one 4-way handshake in the current band and subsequently perform RSNA setup for the supported band by conducting another 4-way handshake in the current band (note that RSNA authentication is conducted once for all bands). In a second implementation, the STA and the AP may perform joint multiband RSNA for all supported bands by conducting RSNA authentication and a single 4-way handshake in the current band to establish RSNA for all supported bands. A robust security network association (RSNA) for multiple bands jointly formed using the second implementation may be called a joint multiband RSNA.

In the first implementation, the STA and the AP conduct a 4-way handshake in the current band to establish security for a supported band (not the current band) as follows. The 4-way handshake is conducted in the current band to negotiate a pairwise cipher suite for the supported band and to establish a pairwise transient key security association (PTKSA) and a group temporal key security association (GTKSA) for the supported band.

In a first message (message 1), the AP supplies the ANonce to the STA. In a second message (message 2), the STA provides a supplicant Nonce (SNonce), a message integrity code (MIC), and a robust security network information element (RSN IE) or a multiband IE or a multiband RSN IE to the AP. The RSN IE or multiband IE or multiband RSN IE indicates a pairwise cipher suite selected by the STA for the supported band. There are multiple ways to indicate the selected pairwise cipher suite for a supported band including 1) use RSN IE with band ID, 2) use multiband IE with pairwise cipher suite for the supported band, 3) use a special multiband RSN IE.

Additionally, when different bands have different MAC addresses, the second message includes a MAC address key data encapsulation (KDE) associated with the supported band. KDE is a format for data other than information elements in an EAPOL-Key data field, where EAPOL denotes extensible authentication protocol over LANs. Another approach is to include multiband IE which contains both the MAC address and the selected pairwise cipher suite.

In a third message (message 3), the AP supplies an authenticator Nonce (ANonce), a message integrity code (MIC), and a robust security network information element (RSN IE) (or a multiband IE or multiband RSN IE). The RSN IE (or a multiband IE or multiband RSN IE) is associated with the supported band indicated by the STA in a beacon, a mmWave beacon, an announce frame, a probe response frame, or an information response frame. Optionally, the AP may also include another RSN IE indicating a pairwise cipher suite selected by the AP for the supported band.

Additionally, when different bands have different MAC addresses, the third message includes a MAC address key data encapsulation (KDE) associated with the supported band. Another approach is to include multiband IE which contains both the MAC address and the selected pairwise cipher suite. Further, the third message includes a group temporal key (GTK) generated by the AP for the supported band. A fourth message (message 4) includes message integrity code (MIC) supplied by the STA to the AP.

Based on the information exchanged in the 4-way handshake, the security modules of the STA and the AP generate the pairwise transient key (PTK) and the group temporal key (GTK) for the supported band. The PTK and the GTK for the supported band are installed (i.e., stored) in the respective encryption modules of the supported bands in the AP and the STA.

For example, the PTK and the GTK for the 60 GHz band are stored in the GCMP encryption modules of the STA and the AP while the PTK and the GTK for the 2.4/5 GHz bands are stored in the CCMP encryption modules of the STA and the AP. Thus, the PTK and the GTK for the supported band are available for encrypting data when the bands are switched. Accordingly, after switching the bands, generating the PTK and the GTK for the supported band is obviated.

In the second implementation, the STA and the AP perform joint authentication for all supported bands by conducting a single 4-way handshake in the current band as follows. Specifically, a single 4-way handshake is used to negotiate pairwise cipher suites and to establish pairwise temporal key security associations (PTKSAs) and group temporal key security associations (GTKSAs) for both the current band and all other supported bands.

In a first message (message 1), the AP supplies the ANonce to the STA. In a second message (message 2), the STA provides a supplicant Nonce (SNonce), a message integrity code (MIC), and robust security network information elements (RSN IEs) to the AP. The RSN IEs indicate pairwise cipher suites selected by the STA for both the current band and the other supported bands. The second message also includes multiband RSN IEs when both the STA and the AP are capable of jointly establishing robust security network association (RSNA) for multiple supported bands in a single 4-way handshake. Additionally, when different bands have different MAC addresses, the second message includes MAC address key data encapsulations (KDEs) associated with the other supported bands. Multiband IEs can be used to replace the multiband RSN IE and MAC address KDEs.

In a third message (message 3), the AP supplies an authenticator Nonce (ANonce), a message integrity code (MIC), and robust security network information elements (RSN IEs). The RSN IEs are associated with both the current band and the other supported bands indicated by the STA in a beacon, a mmWave beacon, an announce frame, a probe response frame, or an information response frame. Optionally, the AP may also include additional RSN IEs indicating a pairwise cipher suite selected by the AP for the other supported bands. The third message also includes multiband RSN IEs for allowed ones of the other supported bands when both the STA and the AP are capable of jointly establishing robust security network association (RSNA) for the allowed bands in the single 4-way handshake.

Additionally, when different bands have different MAC addresses, the third message includes MAC address key data encapsulations (KDEs) associated with the other supported bands. Further, the third message includes group temporal keys (GTKs) generated by the AP for both the current band and the allowed ones of the other supported bands. A fourth message (message 4) includes message integrity code (MIC) supplied by the STA to the AP.

An EAPOL-Key confirmation key (KCK), where EAPOL denotes extensible authentication protocol over local area networks, and an EAPOL-Key encryption key (KEK) associated with the current band are used in the single 4-way handshake in the joint multiband RSNA setup. Alternatively, a KCK and a KEK associated with a smallest band ID may be used in the single 4-way handshake in the joint multiband RSNA setup. Only one KCK and one KEK are sufficient to protect the 4-way handshake.

Based on the information exchanged in the single 4-way handshake, the security modules of the STA and the AP generate the pairwise transient key (PTK) and the group temporal key (GTK) for the supported band. The PTK and the GTK for the supported band are and installed (i.e., stored) in the respective encryption modules of the supported bands in the AP and the STA.

For example, the PTK and the GTK for the 60 GHz band are stored in the GCMP encryption modules of the STA and the AP while the PTK and the GTK for the 2.4/5 GHz bands are stored in the CCMP encryption modules of the STA and the AP. Thus, the PTKs and the GTKs are available for encrypting data when the bands are switched. Accordingly, after switching bands, generating the PTKs and the GTKs for the new bands is obviated.

In joint multiband RSNA, the authenticator (e.g., the AP) may occasionally reject (i.e., disallow) some of the bands requested by the supplicant (e.g., the STA). The supplicant may include robust security network information elements (RSN IEs) of all desired bands in message 2 of the 4-way handshake. The authenticator may reject RSNA setup requests for some or all of the requested bands using one or more of the following methods.

For example, in message 3 of the 4-way handshake, the authenticator may include RSN IEs and/or authenticator's pairwise cipher suits of only the accepted bands. The authenticator may include in message 3 the RSN IEs of all desired bands (as in beacon/probe response) and also include additional RSN IEs with null pairwise cipher suites for the rejected bands. The authenticator may include in message 3 the error key data encapsulations (KDEs) to indicate rejected/unacceptable bands. The authenticator may send error messages to the supplicant regarding rejected bands. The authenticator may initiate a disauthentication primitive and send a disauthentication frame to the supplicant to specify a failed RSNA setup in the rejected bands. The authenticator may simply reject all bands and ask the supplicant to retry each band one-by-one.

If the authenticator rejects the current band, the authenticator also rejects all bands. Occasionally, the joint multiband robust security network association (RSNA) may not include the current band. That is, the joint multiband RSNA may be performed for one or more bands other than the current band.

Referring now to FIGS. 8-11, the key management module (e.g., the key management module 450 shown in FIG. 4) may derive pairwise transient keys (PTKs) and group temporal keys (GTKs) in different ways. For example, in FIGS. 8 and 9, the PTKs and the GTKs are generated using multiple pseudo-random functions (PRFs) while in FIGS. 10 and 12, the PTKs and the GTKs are generated using a single pseudo-random function (PRF).

Figures 8, 9:
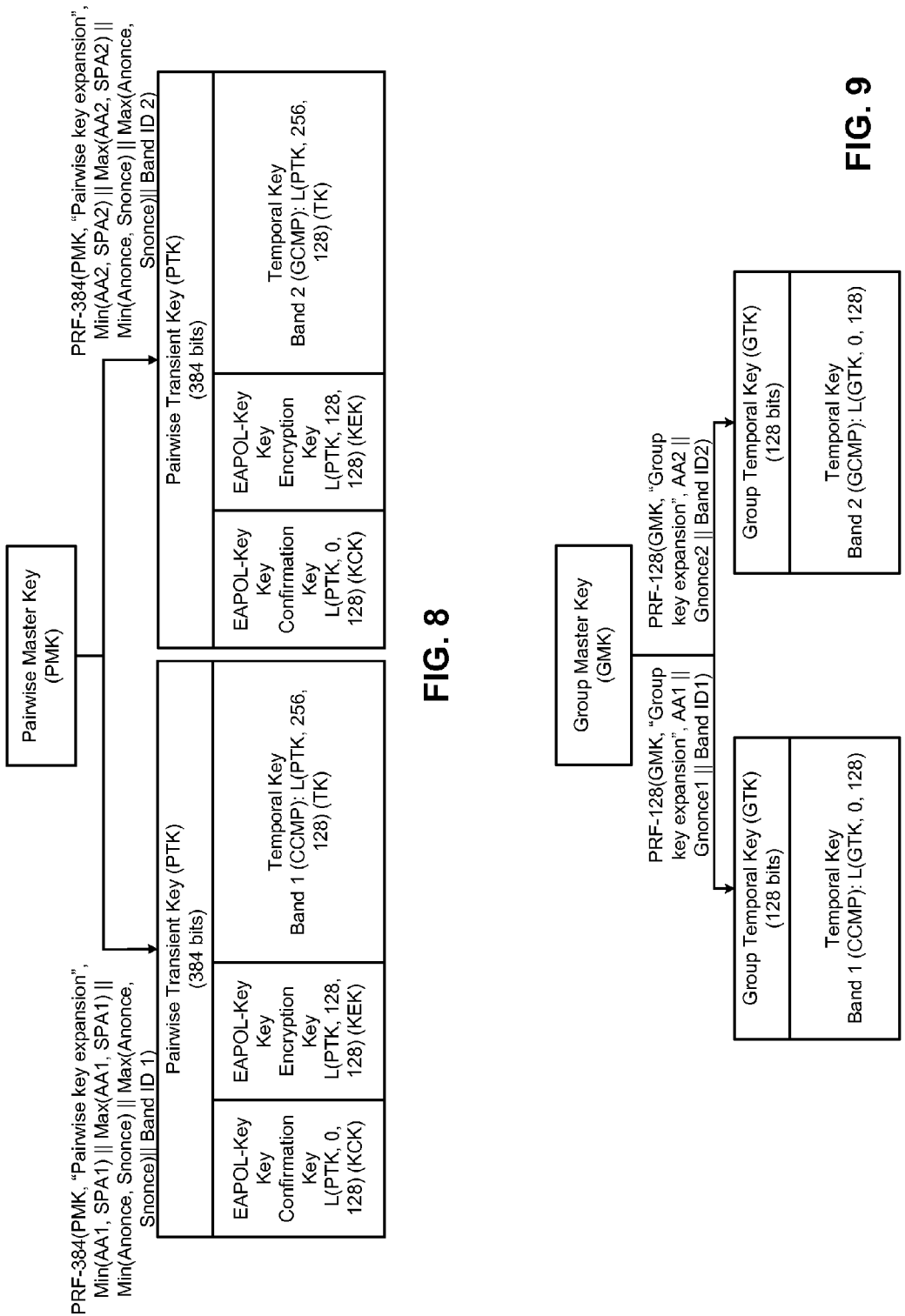
FIG. 8 depicts multiband pairwise key hierarchy using multiple pseudo random functions (PRFs)
FIG. 9 depicts multiband group key hierarchy using multiple PRFs.

In FIG. 8, the key management module (e.g., the key management module 450 shown in FIG. 4) derives the pairwise transient key (PTK) for a supported band other than the current band from the pairwise master key (PMK) as follows. PTK={KCK, KEK, TK)}←PRF-384(PMK, "Pairwise key expansion", Min(AA, SPA)||Max(AA, SPA)||Min (ANonce, SNonce)||Max(ANonce, SNonce)||Band ID). PRF-384 generates a 384-bit key. AA is authenticator's MAC address associated with the supported band, and SPA is supplicant's MAC address associated with the supported band. The remaining acronyms have been defined above.

The key management module uses multiple pseudo-random functions (PRFs) to derive multiple pairwise transient keys (PTKs) (i.e., one PTK per band). The same nonces, which are exchanged through the single 4-Way handshake, are used for all PRFs. When all bands share the same MAC address, the band ID or regulatory class is added as an input to the PRF to differentiate PTKs for different bands.

The KCK and the KEK corresponding to the current band are used in the single 4-Way handshake. The KCK and the KEK corresponding to other bands are disregarded. Alternatively, PRFs for the other bands only produce temporal keys (TKs). Different PRFs are used to compute different TKs for different bands.

In FIG. 9, the key management module (e.g., the key management module 450 shown in FIG. 4) derives the group temporal key (GTK) for a supported band other than the current band from the group master key (GMK) as follows. {GTK}={PRF-128(GMK, "Group key expansion", AA‖GNonce‖Band ID. PRF-128 generates a 128-bit key. GNonce is group nonce. The remaining acronyms have been defined above.

The key management module adds band ID (e.g., regulatory class) as an input to PRF. The key management module may use same or different Gnonces for different bands. The key management module uses different PRFs to compute different group temporal keys (GTKs) for different bands.

The key management module may generate PRFs for multiple bands in different ways. For example only, two options are described. In a first option, the order of KEK, KCK, and TK may be reversed from a normal order of usage (i.e., from {KEK, KCK, TK} to {TK, KCK, KEK}). If the TK is for the other supported band, the KCK and the KEK for the other supported band are discarded since only KCK and KEK of the current band are used in the 4-way handshake.

Thus, {TK, KCK, KEK}=PRF-384(PMK, "Pairwise key expansion", Min(AA, SPA)‖Max(AA, SPA)‖Min(Anonce, Snonce)‖Max(Anonce, Snonce)‖Regulatory Class or Band ID). If the pairwise transient key (PTK) is derived for the current band, KCK and KEK are used in the 4-Way handshake. If the PTK is derived for a supported band other than the current band, KCK and KEK are not derived/used.

In a second option, the key management module generates KCK and KEK for only the current band and generates only TK for all other bands. Thus, {KCK, KEK, TK}=PRF-384(PMK, "Pairwise key expansion", Min(AA, SPA)‖Max(AA, SPA)‖Min(Anonce, Snonce)‖Max(Anonce, Snonce)‖Regulatory Class/Band ID) is used for deriving PTK for the current band (Regulatory Class may be omitted). {TK}=PRF-128(PMK, "Pairwise key expansion", Min(AA, SPA)‖Max(AA, SPA)‖Min(Anonce, Snonce)‖Max(Anonce, Snonce)‖Regulatory Class) is used for deriving PTK a supported band other than the current band.

Figure 10:
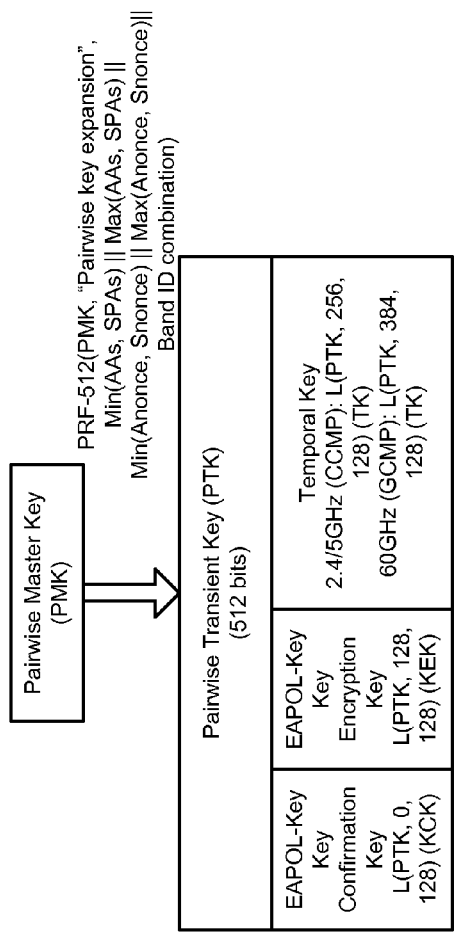
FIG. 10 depicts multiband pairwise key hierarchy using a single PRF.

In FIG. 10, a single PRF may be used instead of using multiple PRFs to derive the PTKs for multiple bands. More specifically, when joint multiband robust security network association (RSNA) is used, only one PRF may be used to derive a KCK, a KEK, and multiple TKs for multiple bands. Band ID combination can be a sequential (increasing or decreasing) concatenation of band IDs of all involved bands. The sequence of band IDs in Band ID combination determines the TK output sequence from the PRF. AA/SPA used corresponds to the current band. Alternatively, the AA/SPA used is a combination of AAs/SPAs of all involved bands in the same sequence as in Band ID combination.

Figure 11:
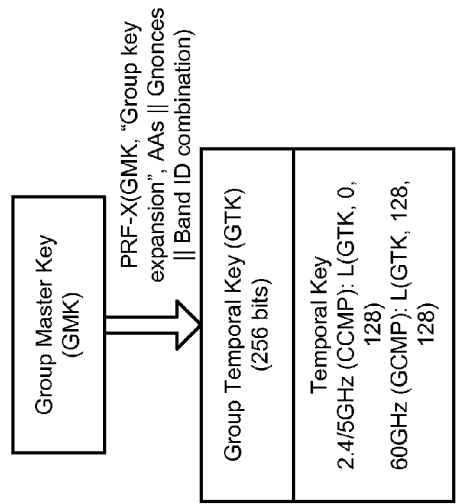
FIG. 11 depicts multiband group key hierarchy using a single PRF.

In FIG. 11, a single PRF may be used instead of using multiple PRFs to derive the GTKs for multiple bands. Band ID combination can be a sequential (increasing or decreasing) concatenation of band IDs of all involved bands. The sequence of band IDs in Band ID combination determines the GTK output sequence from PRF. AA used corresponds to the current band. Alternatively, AAs is a combination of MAC addresses of all bands in the same sequence as in Band ID combination.

In some implementations, the band ID may not be used in the PRF. Instead, when different bands have different MAC addresses, the same {Anonce, Snonce} can be used to create PTKs for all bands. Alternatively, when different bands share the same MAC address (e.g., for both STAs), the PRF function may be configured to output sufficient number of key bits to serve multiple pairwise transient keys (PTKs). That is, the key bits are sufficient in number and can be divided to generate PTKs for multiple bands. For example, since the 60 GHz band uses GCMP and the 2.4/5 GHz bands use CCMP, PRF-768 is used to generate a 768-bit key for both CCMP PTK and GCMP PTK.

PTK (i.e., PTK=KCK|KEK|TK) may be partially shared by multiple bands. KCK and KEK are mainly used by Station Management Entity (SME). TK is mainly used by MAC Data and Management Entities. To maintain the same SME for all bands, KCK and KEK may be shared by all bands, and a different TK is assigned to each band. For example, PRF-512 can be used to generate one KCK, one KEK, and two TKs for CCMP and GCMP (i.e., one TK for each of CCMP and GCMP).

Referring now to FIGS. 12A-12E, band IDs may be communicated in many ways. For example, in FIG. 12A, the band IDs may be added to the MAC address key data capsulation (KDE). In FIG. 12B, the band IDs may be added to a group temporal key (GTK) KDE. In FIG. 12C, the band IDs may be added to a Key ID KDE. Band IDs can also be included in all other KDEs, which allow different bands to have different pairwise master keys (PMKs) and station-to-station link (STSL) master keys (SMKs). The band ID is included in the KDEs to indicate that the KDEs are band dependent.

In FIG. 12D, when joint multiband robust security network associate (RSNA) is used, a field in EAPOL-Key frame may be used to indicate the number of bands for the joint RSNA setup. For example, the field (Reserved—8 octets (shown highlighted)) may be used to include sequential band ID (regulatory class) list with a sequence that is the same as the temporal key (TK) output from the pseudo-random function (PRF). Message 2 and 3 of a 4-way handshake include this field. Message 2 may include the number of intended bands. Message 3 may include the number of allowed bands.

In FIG. 12E, when joint multiband robust security network associate (RSNA) is used, a field in the Key information field in EAPOL-Key frame may be used to indicate the number of bands for the joint RSNA setup. For example, the field (Reserved B4-B5) and/or the field (Reserved B14-B15) (both shown highlighted) may be used to indicate the number of bands for the joint RSNA setup. Message 2 and 3 of a 4-way handshake include this field. Message 2 may include the number of intended bands. Message 3 may include the number of allowed bands.

Occasionally, when a single 4-way handshake is used to generate pairwise transient keys (PTKs) for multiple bands, a PTK security association (PTKSA) formed using one of the PTKs may fail. One option is to delete all PTKSAs. Alternatively, the PTKSAs may be separated, and the failed PTKSA may be corrected.

Specifically, during a fast session transfer (FST), a STA pair may choose to invoke disassociation in an old band and delete PTKSA/GTKSA associated with the old band before switching to a new band. A STA pair may also choose to maintain the association/RSNA in the old band and reuse the same association/RSNA when switching back to the old band.

The security module of a wireless device (e.g., the security module 450 of the wireless device 400 shown in FIG. 4) may perform disassociation in one of two ways: Common association/disassociation for all bands or Independent association/disassociation.

In common association/disassociation for all bands, when disassociation is invoked in one band, associations/RSNAs in other bands also become invalid. PTKSAs/GTKSAs associated with all bands are deleted. In independent association/disassociation, when disassociation is invoked in current band, associations/RSNAs in other bands are still valid. PTKSA/GTKSA associated with the current band is deleted. PTKSAs/GTKSAs associated with other bands are maintained. After reassociation, if the association/RSNA of other bands are still valid, only the RSNA/PTKSA/GTKSA of the current band are re-established.

Alternatively, the security module may perform rekeying. An update of PTKSA/GTKSA of one band does not affect the PTKSAs and GTKSAs of other bands. Temporal key (TK) rekeying can occur in the band currently associated or another band (in use).

Figures 13A, 13B:
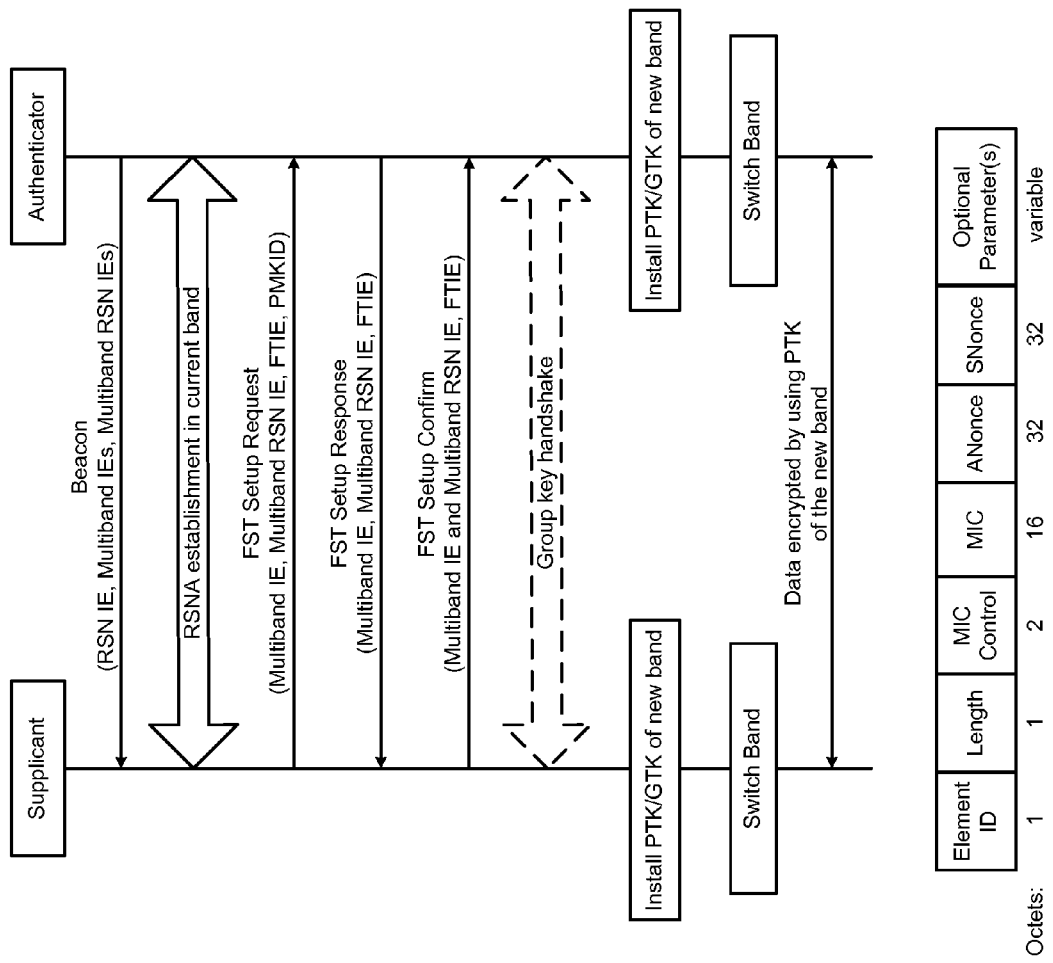
FIGS. 13A and 13B depict a joint multiband RSNA between a supplicant and an authenticator without using a 4-way handshake.

Referring now to FIGS. 13A and 13B, the security module (e.g., the security module 450 of the wireless device 400 shown in FIG. 4) may perform multiband robust security network association (RSNA) without using a 4-way handshake. Instead, fast session transfer (FST) setup frames comprising a Fast BSS Transition information element (FTIE) may be exchanged to establish security for the new band before switching bands.

For example, in FIG. 13A, after RSNA is established in the current band, the supplicant may send a FST setup request before switching bands. The authenticator may respond by sending a FST setup response frame. The supplicant and authenticator may exchange information used to setup pairwise transient key (PTK) for the new band through the FST setup request and response frames. For example, the information may be exchanged in a format shown in FIG. 13B through FST request and response frames. The supplicant may confirm the FST setup for the new band by sending a FST setup confirm frame.

The FST setup frames may or may not be encrypted using the PTK of the current band. When the FST setup frames are encrypted by using the PTK of the current band, a pairwise master key (PMK) may not be needed (PMKID can be omitted from FST Setup Request), and zero PMK is used to derive PTK. Group key information can be included in the FST setup response frame and the FST setup confirm frame.

When the FST setup frames are not encrypted, a PMK is needed, and the PMK associated with the current band is used. Group key information can be conveyed by using a group key handshake as shown. For rekeying, PTK KeyID is included in the FST setup frames. In some implementations, a 4-Way handshake encrypted by the PTK of the current band can also be used to create PTK for new band using zero PMK.

The techniques for multiband RSNA disclosed above can be extended to multi-link RSNA, where links are based on criteria other than frequency bands (e.g., quality of service (QOS) priority). The links may have their own security setup. The security setup for a new link or links may be established in a current link before switching link in the manner described above.

For example, a STA pair may establish multiple secured links in one frequency band. Alternatively, different links may be associated with different communication mediums or communication paths. Link IDs are used to differentiate different links. A Link ID is included as an input to the pseudo-random function (PRF) to generate PTK/TK for a link. The Link ID may also be included in a MAC protocol data unit (MPDU) security header using reserved bits in keyID octets.

Figure 14A:
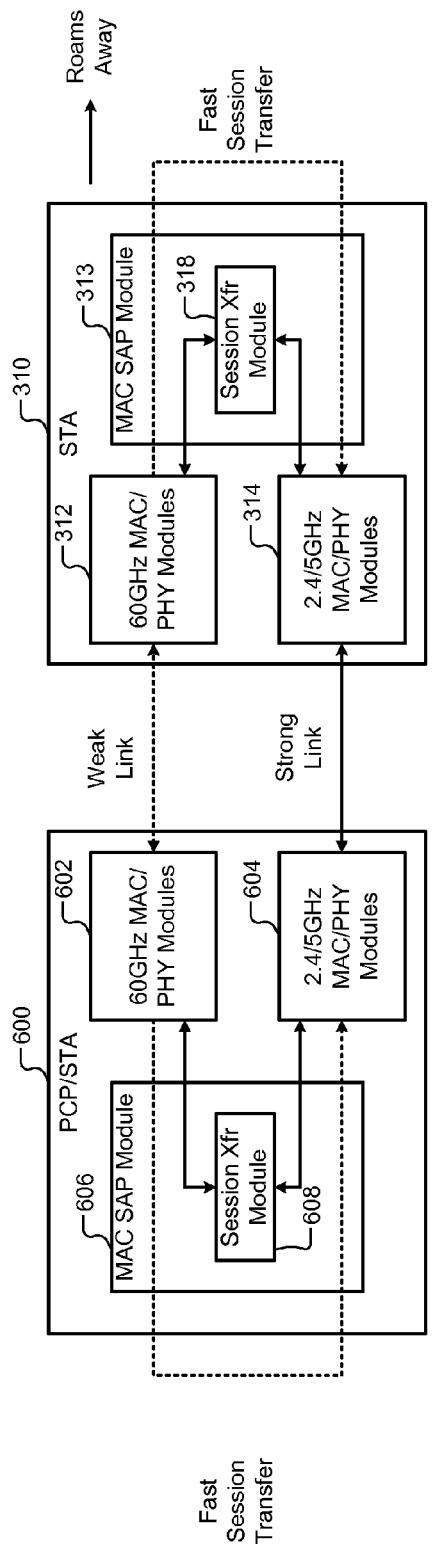
FIG. 14A is a functional block diagram of the two multiband devices each capable of operating in the 60 GHz frequency band and the 2.4/5 GHz frequency bands.
Figure 14B:
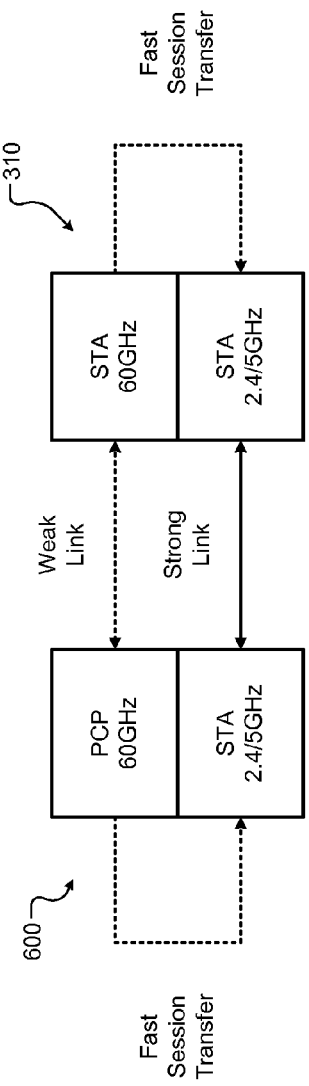
FIG. 14B shows the two multiband devices shown in FIG. 14A communicating with each other.

Referring now to FIGS. 14A and 14B, a PCP/STA 600 and the STA 310 are multiband devices. In FIG. 14A, the PCP/STA 600 includes a 60 GHz MAC module and a 60 GHz PHY module collectively shown as 60 GHz MAC and PHY modules 602. Additionally, the PCP/STA 600 includes a MAC module and a PHY module capable of communicating in the 2.4/5 GHz bands, which are collectively shown as 2.4/5 GHz MAC and PHY modules 604. Further, the PCP/STA 600 includes a MAC SAP module 606 that includes a session transfer module 608.

The MAC SAP modules 606, 316 determine when to switch from the 60 GHz band to the 2.4/5 GHz bands. The MAC SAP modules 606, 316 route data through the 60 GHz components 602, 312 when communicating in the 60 GHz band. The MAC SAP modules 606, 316 route data through the 2.4/5 GHz components 604, 314 when communicating in the 2.4/5 GHz bands. The session transfer modules 608, 318 switch the link of the PCP/STA 600 and the STA 310 from the 60 GHz band to 2.4/5 GHz bands.

In FIG. 14B, the PCP/STA 600 functions as a personal basic service set (PBSS) control point (PCP) in the 60 GHz band and as a STA in an independent BSS (IBSS) in the 2.4/5 GHz bands. The PCP/STA 600 and the STA 310 can communicate in the PBSS in the 60 GHz band. Additionally, the PCP/STA 600, which functions as a STA in an IBSS, and the STA 310 can communicate in the IBSS in the 2.4/5 GHz bands.

In the 60 GHz band (i.e., in the PBSS), the PCP/STA 600 and the STA 310 can be the authenticator and supplicant, respectively. In the 2.4/5 GHz bands (i.e., in the IBSS), the PCP/STA 600, which functions as a STA, can be the authenticator, and the STA 310 can be the supplicant. Alternatively, in the 2.4/5 GHz bands (i.e., in the IBSS), the PCP/STA 600, which functions as a STA, can be the supplicant, and the STA 310 can be the authenticator.

The PCP/STA 600 and the STA 310 may switch bands using techniques described above. Specifically, in the IBSS, when both STAs have group keys for multiple bands, the PCP/STA 600 and the STA 310 may use message 3 and message 4 of a 4-way handshake to exchange multiband group keys, or a separate group key handshake can be used as described above.

Figure 15:
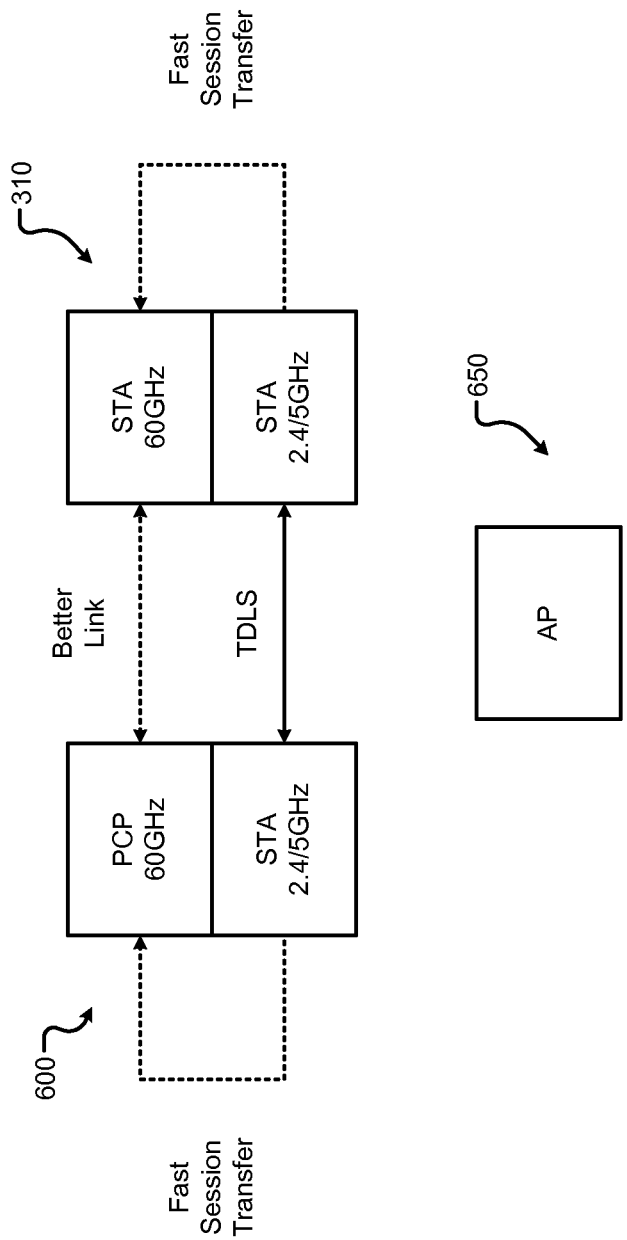
FIG. 15 shows the two multiband devices shown in FIG. 14B communicating with an access point.

Referring now to FIG. 15, when the PCP/STA 600 functions as a STA in the 2.4/5 GHz bands, the PCP/STA 600 and the STA 310 may communicate in the 2.4/5 GHz bands in two ways: The PCP/STA 600 and the STA may communicate via an AP 650 and/or using a direct link setup (DLS) between the PCP/STA 600 and the STA 310.

When DLS is used, station-to-station link (STSL) master key security association (SMKSA) and STSL transient key security association (STKSA) may be established between the STA pair (i.e., between the PCP/STA 600 and the STA 310). When SMKSA and STKSA are established between the STA pair, the same SMKSA can be used to create PTKSA between the STA pair for the 60 GHz band using a 4-way handshake in the 2.4/5 GHz bands. If the STA pair is capable of joint multiband robust security network association (RSNA), the same 4-Way Handshake that is used to create STKSA can be used to create PTKSA for the 60 GHz band before switching bands.

When a tunneled DLS (TDLS) is used instead of DLS, no master key is installed between a STA pair (e.g., between the PCP/STA 600 and the STA 310). The security modules of the STA pair establish security for the 60 GHz band without a master key and before switching bands in many ways described below.

For example, the STA pair may tunnel TDLS peer key (TPK) handshake messages through the AP 650 to create TPKSA/PTKSA for the 60 GHz band. A TDLS Setup/TDLS Peer Key Handshake (TPK Handshake) (tunneling through AP/PCP) can be reused to create PTKSA/STKSA/TPKSA for the 60 GHz band. Multiband IE/Multiband MAC address, and Multiband RSN IE are included in the TPK Handshake messages.

Alternatively, if the STA pair is capable of joint multiband robust security network association (RSNA), a single TDLS Setup/TPK Handshake (tunneling through AP/PCP) can be used to create TDLS/TPKSA/PTKSA for both/all bands. RSN IEs and MAC addresses associated with both/all bands are included in the TPK Handshake messages.

In some implementations, a TDLS Setup/TPK Handshake encrypted by the TPK associated with the 2.4/5 GHz bands can be used directly between the STA pair (w/o tunneling through AP/PCP) to create TDLS/PTKSA/STKSA/TPKSA for the 60 GHz band. Alternatively, a 4-way handshake encrypted by the TPK associated with the 2.4/5 GHz bands can be used to create PTKSA/STKSA/TPKSA for the 60 GHz band without a master key. In other implementations, a FST Setup Handshake, either tunneling through AP/PCP or encrypted by the TPK associated with the 2.4/5 GHz bands can also be used to create PTKSA/STKSA/TPKSA for the 60 GHz band without a master key.

When DLS is used, a master key may be used to establish security for the 60 GHz band before switching bands as follows. A station-to-station link (STSL) master key (SMK) Handshake can be used to create SMKSA between the STA pair, and a 4-way STKSA handshake can be used to create PTKSA/STKSA for the 60 GHz band. Alternatively, RSNA authentication can be performed between the two STAs in the 2.4/5 GHz bands and a pairwise master key security association (PMKSA) is created for the STA pair. Then a 4-way handshake is used to create pairwise transient key security association (PTKSA) for the 60 GHz band before switching bands. In some implementations, if a preshared key (PSK) is used in the BSS (i.e., in the 2.4/5 GHz band), the same PSK can be used to create PTKSA between the STA pair for the 60 GHz band before switching bands.

When no DLS/TDLS is established in the 2.4/5 GHz bands, i.e. all data are relayed by AP/PCP, the security for the 60 GHz band is established before switching bands in many ways. For example, TDLS Setup/TPK Handshake or FST Setup Handshake (tunneling through AP/PCP) can be used in the 2.4/5 GHz bands to create TDLS/TPKSA/PTKSA for the 60 GHz band. Multiband IE/Multiband MAC address and Multiband RSN IE are included in TPK/FST Setup Handshake messages. Alternatively, a SMK Handshake can be used to create SMKSA between the STA pair, and a 4-Way Handshake can be used to create PTKSA/STKSA for the 60 GHz band.

In some implementations, RSNA authentication can be conducted between two STAs in the 2.4/5 GHz bands and a pairwise master key security association (PMKSA) is created for the STA pair. Then a 4-way handshake is used to create a pairwise transient key security association (PTKSA) for the 60 GHz band. Alternatively, if a preshared key (PSK) is used in the BSS (i.e., in the 2.4/5 GHz bands), the same PSK can be used to create PTKSA between the STA pair for the 60 GHz band.

Figure 16A:
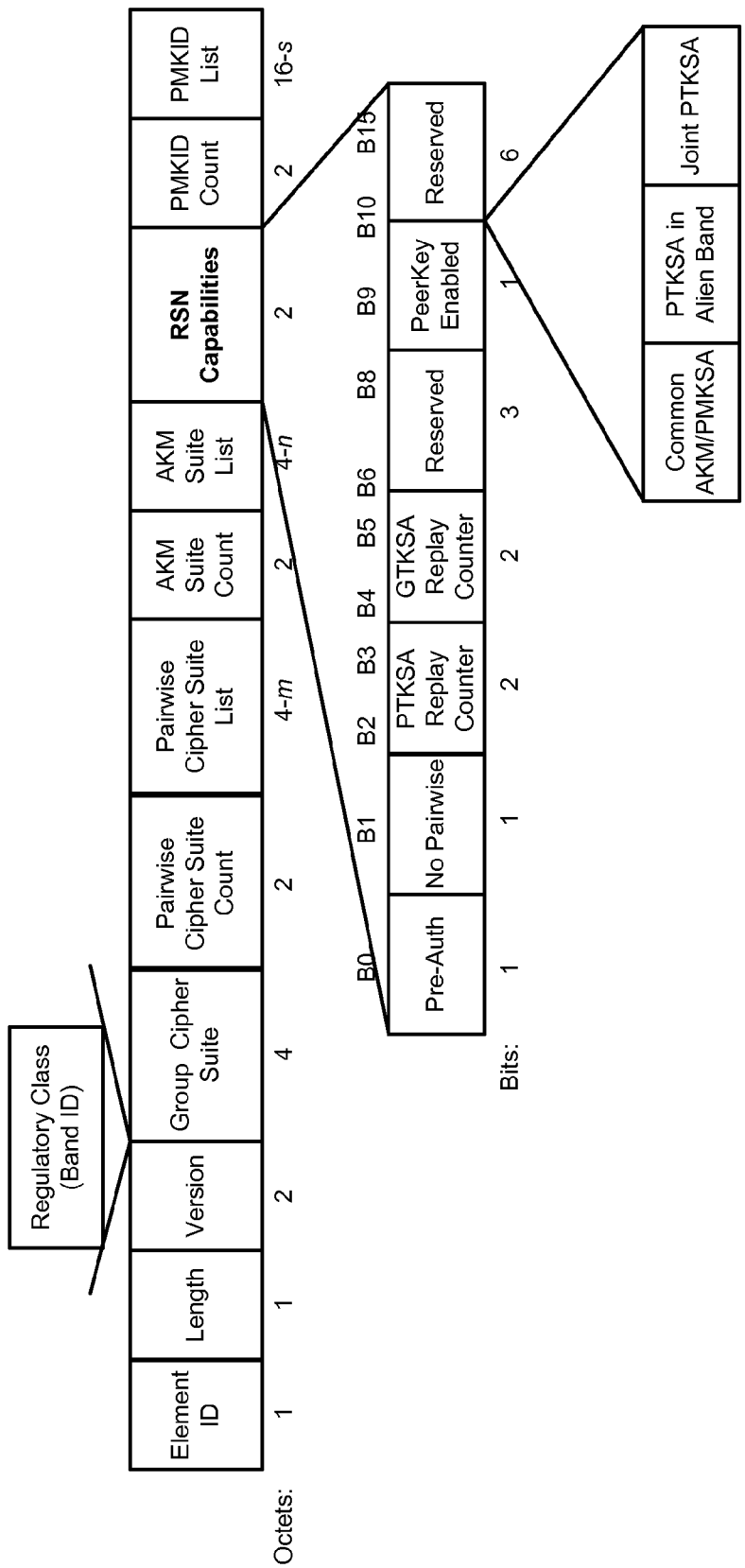
FIG. 16A depicts a multiband RSN IE with added RSN capabilities.

Referring now to FIGS. 16A-16E, STAs can choose to establish multiband RSNA in the current band before switching bands in multiple ways. In FIG. 16A, the STAs can set newly added RSN capabilities fields (shown highlighted) in multiband RSN IEs to indicate a way in which to establish multiband RSNA. Specifically, the newly added RSN capabilities fields are Common AKM/PMKSA, PTKSA in Alien Band (i.e., a band other than the current band), and Joint PTKSA.

Figure 16C:
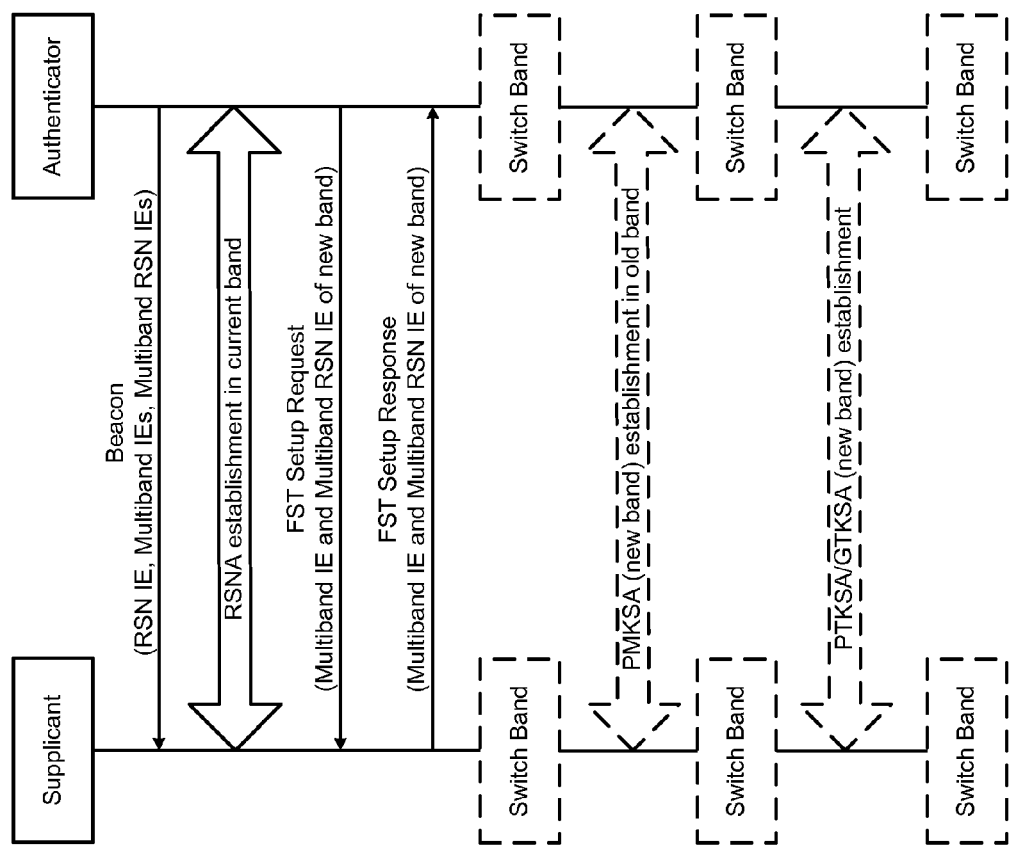
FIG. 16C shows many ways of establishing multiband RSNA between a supplicant and an authenticator.
Figure 16D:
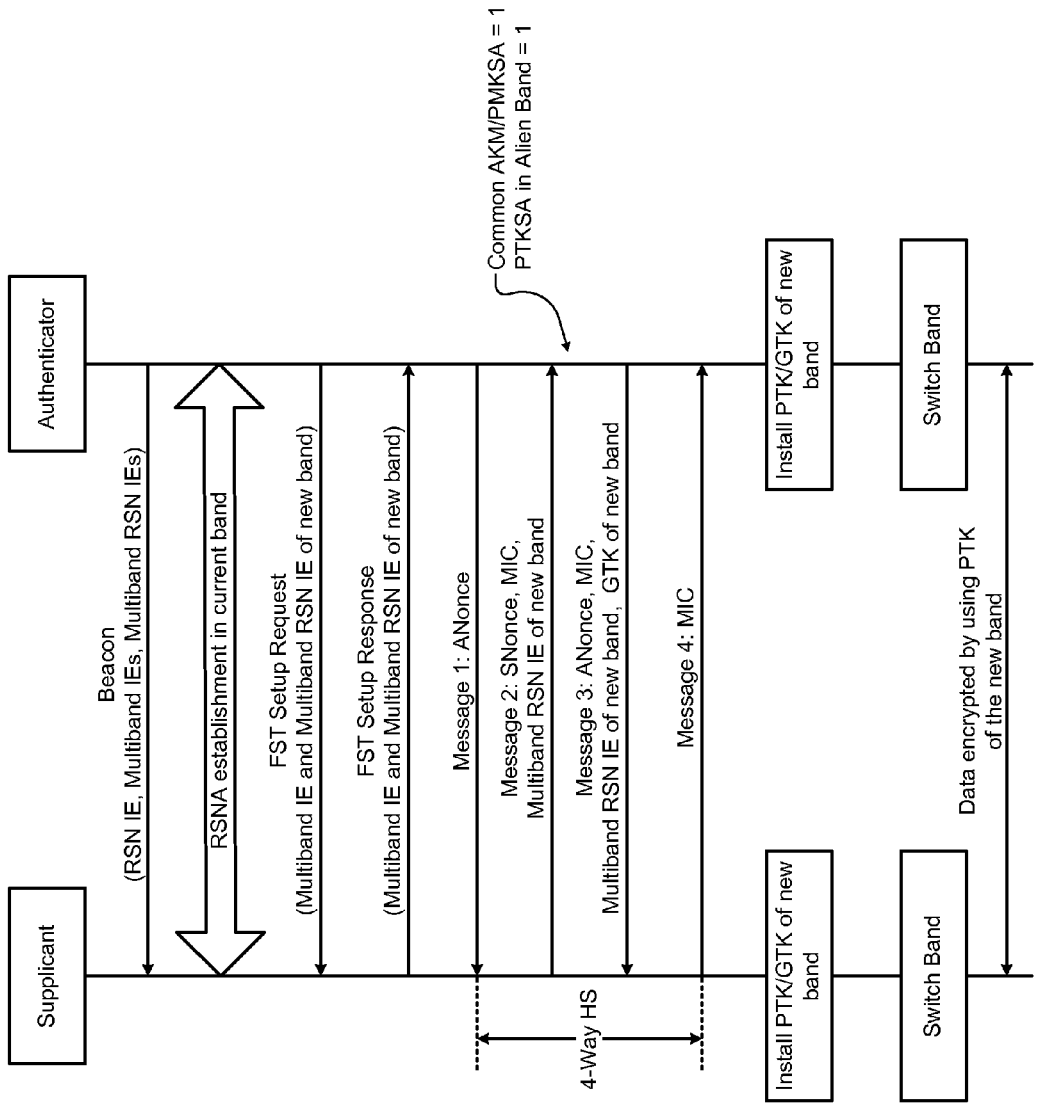
FIGS. 16D and 16E show examples of establishing multiband RSNA between a supplicant and an authenticator in two ways.
Figure 16E:
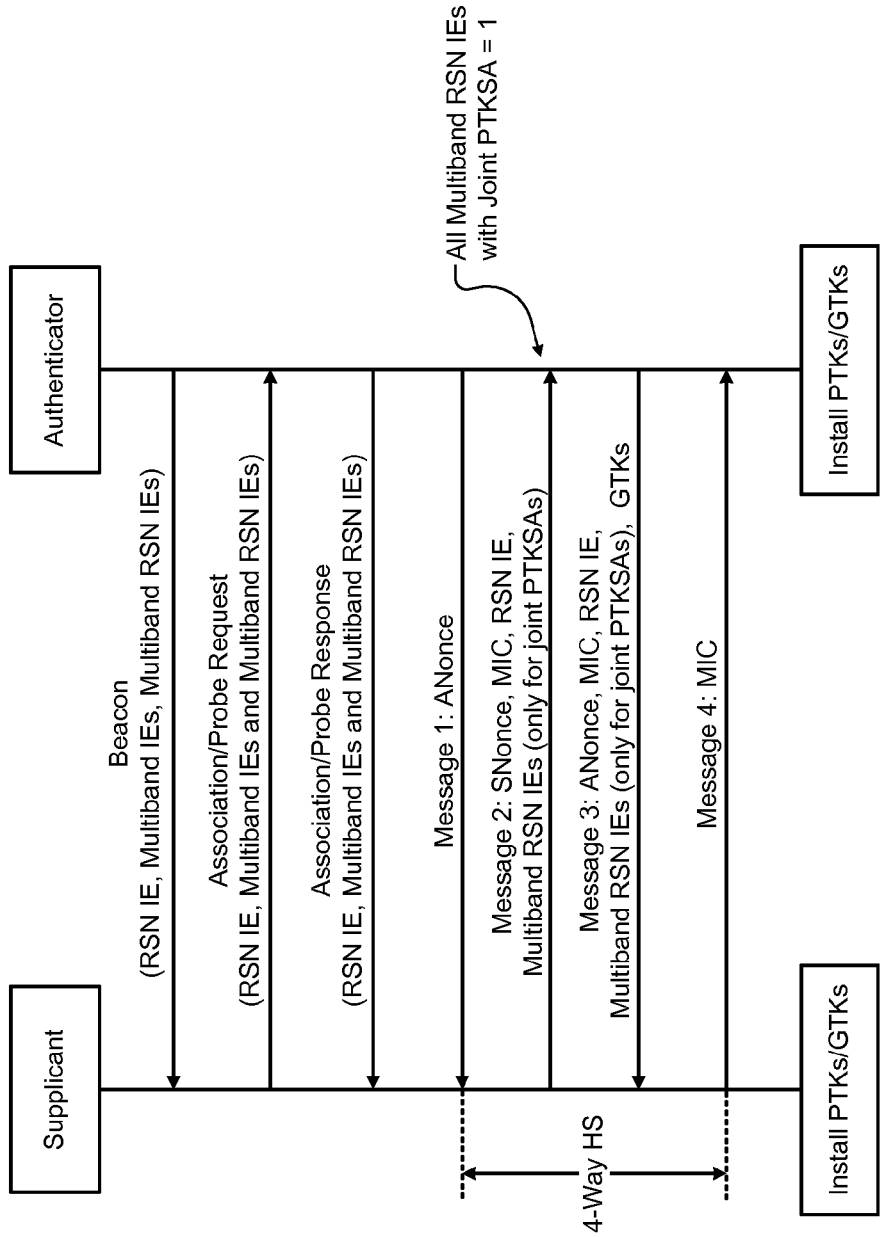

In FIG. 16B, a table shows values that can be used to set the Common AKM/PMKSA, PTKSA in Alien Band, and Joint PTKSA fields to select a way of establishing multiband RSNA. In FIG. 16C, the multiple ways of establishing multiband RSNA are shown. For example, the STAs can perform PMKSA before or after switching bands as shown. Additionally, the STAs can perform PTKSA/GTKSA before or after switching bands as shown. In FIGS. 16D and 16E, examples of establishing multiband RSNA in two ways are shown.

In general, the security modules of STAs may establish multiband RSNA in the current band before switching bands in one of the following ways. The security modules can establish pairwise master key security association (PMKSA)/pairwise transient key security association (PTKSA) and group master key security association (GMKSA)/group transient key security association (GTKSA) in each band separately. The security modules can establish a common PMKSA/GMKSA in one band and establish PTKSA/GTKSA in each band separately. The security modules can establish PMKSA/GMKSA of a new band in the old band and establish PTKSA/GTKSA of the new band in the new band. The security modules can establish PMKSA/PTKSA and GMKSA/GTKSA of a new band in the old band. The security modules can establish a common PMKSA/GMKSA and establish the PTKSA/GTKSA of a new band in the old band. The security modules can establish a common PMKSA/GMKSA and jointly establish PTKSA/GTKSA of one or more bands other than the current band with PTKSA/GTKSA of the current band.

Thus, multiband wireless devices can perform fast session transfer from the current band to a new band by performing authentication for the new band in the current band before switching from the current band to the new band.

The transparent mode and non-transparent mode are now described in detail. As mentioned in the brief description of the hybrid approach, the multiband devices can be configured to operate in one of two multiband modes: the non-transparent mode or the transparent mode.

Specifically, a multiband device can be of two types: (1) The multiband device can have a single MAC address for all bands (Type 1 Device); or (2) the multiband device can have different MAC addresses for different bands (Type 2 Device). Type 1 Device can operate in both transparent and non-transparent mode. Device type 2 can only operate in non-transparent mode. In transparent mode, a single PMKSA and a single PTKSA is used for all bands. In non-transparent mode, a single PMKSA is used for all bands while different PTKSAs are used for different bands.

When a Type 1 Device communicates with a Type 1 device, either transparent mode or non-transparent mode can be used, and parameters other than MAC address can be used to differentiate different bands. When a Type 1 Device communicates with a Type 2 device, only non-transparent mode can be used because the Type 2 Device has different MAC addresses for different bands and therefore needs different PTKSAs for different bands. When a Type 2 Device communicates with a Type 2 device, only non-transparent mode can be used.

Referring now to FIGS. 17A and 17B, the multiband devices may exchange capabilities relating to the non-transparent mode and the transparent mode in many ways. For example, in FIG. 17A, a field (FST mode field) having a single bit may be exchanged in a frame. The frame can be any management frame (e.g., association frame, FST setup frame, etc.). When the bit is set to 0, the bit may indicate that the multiband device supports the non-transparent mode of session transfer between the bands. When the bit is set to 1, the bit may indicate that the multiband device supports the transparent mode and the non-transparent mode of session transfer between the bands.

In FIG. 17B, two multiband devices (an initiator and a responder) may negotiate operating mode as shown. For example only, the initiator may be a STA, and the responder may be an AP. When two STAs communicate with each other, one STA can be the initiator, and the other STA can be the responder or vice versa.

In the table shown, fast session transfer (FST) mode=0 means that the multiband device supports the non-transparent mode only (i.e., different MAC addresses are used in different bands). FST mode=1 means that the multiband device supports both the non-transparent mode and the transparent mode (i.e., the same MAC address is used for all bands).

When the initiator and the responder both support FST mode 1, the initiator and the responder have two options to select the mode of operation. In option 1, both the initiator and the responder can select the transparent mode since the same MAC address is used for all the bands, and a single temporal key is generated for all the bands using the same MAC address.

Instead, in option 2, the initiator and the responder may select either the transparent mode or the non-transparent mode. If the non-transparent mode is selected, since the same MAC address is used for all the bands, different temporal keys for different bands may be generated in many ways.

For example, band IDs of the bands may be used to generate the different temporal keys despite the MAC address being the same for all the bands. Alternatively, two 4-way handshakes may be performed in the current band to generate two different temporal keys for two different bands. Different 4-way handshakes generate different nonce values (random numbers). For example, in a first 4-way handshake, a first temporal key may be generated for the current band using a first random number. Subsequently, in a second 4-way handshake, a second temporal key for a different band may be generated using a second random number.

If either the initiator or the responder supports the FST mode 0, then the initiator and the responder use the non-transparent mode. If both the initiator and the responder support the FST mode 0, then the initiator and the responder use the non-transparent mode.

Referring again to FIG. 4, in the non-transparent mode, all bands may use the same set of security suites (e.g., the same pairwise cipher suite), if possible. For example, if the encryption module 406 and the encryption module 426 support the same security algorithm (such as GCMP), the same set of security suites can be used for the 60 GHz band and the 2.4/5 GHz bands. A single security engine may be used to encrypt data using the same set of security suites for both bands.

A single master key is used for all bands. A single pairwise master key security association (PMKSA) and a single group master key security association (GMKSA) are established for all bands. Each band uses a different temporal key. Different pairwise transient key security associations (PTKSAs) and group transient key security associations (GTKSAs) are established for different bands based on different MAC addresses of MAC modules 404, 424.

If a STA capable of operating in the transparent mode intends to establish multiband RSNA with a STA capable of operating in the non-transparent mode, the non-transparent mode is used in both STAs since the MAC address pairs are different for different bands. (PTKSA is derived by using MAC address pair from both STAs) Accordingly, different PTKSAs and GTKSAs are established for different bands.

A flag may be used in the robust security network information element (RSN IE) or Multiband IE to indicate the capability of supporting multiband mode (transparent and/or non-transparent). Alternatively, the multiband mode can be indicated by the "MAC address present" field of Multiband IE. For example, when the "MAC address present" field is set and a MAC address is appended to Multiband IE, the supported multiband mode is the non-transparent mode. Otherwise, the supported multiband mode includes both modes.

For non-transparent mode, the security module 450 can establish the PTKSA and the GTKSA for another band (e.g., the 2.4/5 GHz band) in the current band (e.g., the 60 GHz band). If the same set of security suites is used for all bands, a single RSN IE indicating the selected security suite(s) for all bands can be included in the association request and/or message 2 of the 4-way handshake.

A flag can be included in the robust security network information element (RSN IE) to indicate that the RSN IE is for all bands. The Multiband IE associated with the other band can also be included in association request and/or message 2 and 3 of the 4-way handshake to indicate the band in which the PTKSAs/GTKSAs are established. Alternatively, the MAC address key data encapsulation (KDE) associated with the other band can be included in message 2 and 3 of the 4-way handshake.

The security module 450 can use a single 4-way handshake to establish the PTKSAs/GTKSAs for both the current band and other band(s). If the same set of security suites is used for all bands, a single RSN IE indicating the selected security suite(s) for all bands can be included in association request and/or message 2 of the 4-way handshake.

A flag may be included in the RSN IE to indicate that the RSN IE is for all bands. Multiband IEs can be included in the association request and message 2 and 3 of the 4-way handshake to indicate the band in which the PTKSAs/GTKSAs are established. Alternatively, the MAC address KDEs associated with the bands can be included in message 2 and 3 of the 4-way handshake.

Figure 18:
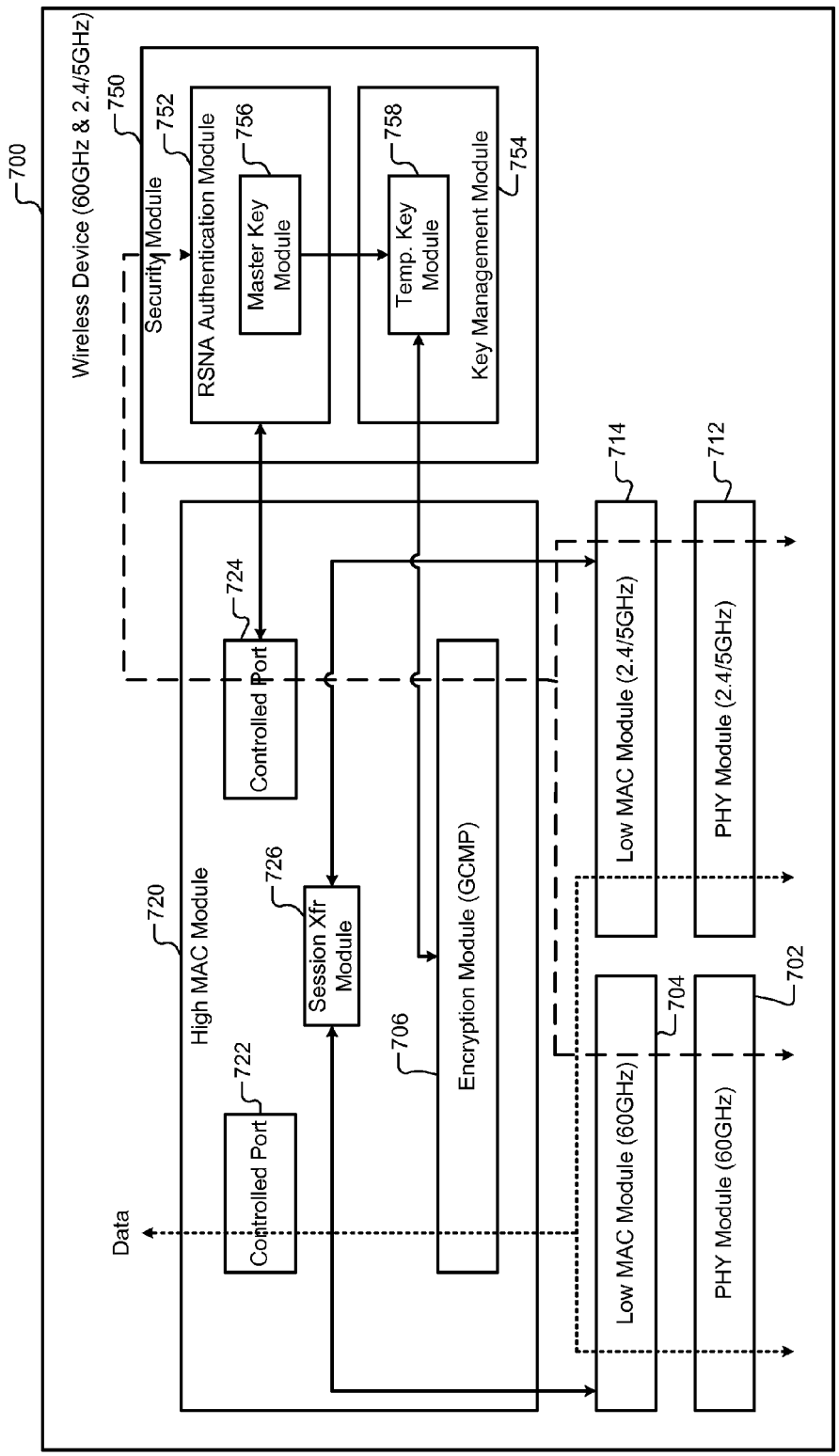
FIG. 18 is a functional block diagram of a multiband wireless device that includes a common MAC and a single encryption module and that operates in the 60 GHz frequency band and the 2.4/5 GHz frequency bands.

Referring now to FIG. 18, a multiband wireless device 700 that can communicate in the 60 GHz band and in the 2.4/5 GHz bands is shown. The wireless device 500 uses transparent mode for session transfers when switching bands. When the wireless device 700 and another wireless device use the transparent mode for session transfers, the two devices can use a single temporal key (TK) for all bands.

The wireless device 700 includes a 60 GHz PHY module 702 and a 60 GHz low MAC module 704 (collectively 60 GHz components 702, 704). The 60 GHz low MAC module 504 is a lower layer MAC module in the hierarchy of the Open System Interconnection (OSI) Reference Model. Additionally, the wireless device 700 includes a 2.4/5 GHz PHY module 712 and a 2.4/5 GHz low MAC module 714 (collectively 2.4/5 GHz components 712, 714). The 2.4/5 GHz MAC module 714 is a lower layer MAC module in the hierarchy of the OSI Reference Model.

Further, the wireless device 700 includes a high MAC module 720 that is common to the 60 GHz band and the 2.4/5 GHz bands. The high MAC module 720 is a higher layer MAC module in the hierarchy of the OSI Reference Model. The high MAC module 720 includes a GCMP encryption module 706 that encrypts data in all bands using a single temporal key (TK). The high MAC module 720 includes a controlled port 722 and an uncontrolled port 724. The controlled port 722 transports encrypted data in the 60

GHz band and in the 2.4/5 GHz bands. The uncontrolled port 724 transports unencrypted data in the 60 GHz band and in the 2.4/5 GHz bands.

Additionally, the wireless device 700 includes a security module 750 that establishes security and performs authentication. The security module 750 includes a robust security network association (RSNA) authentication module 752 and a key management module 754. The RSNA authentication module 752 includes a master key module 756. The key management module 754 includes a temporal key module 758.

The RSNA authentication module 752 performs authentication in the current band once for all bands. Only one preshared key (PSK) is used for all bands. The master key module 756 generates only one pairwise master key (PMK), and only one pairwise master key security association (PMKSA) is established for all bands. The master key module 756 generates only one group master key (GMK). The same pairwise master key (PMK) and the same group master key (GMK) are shared by all bands. The temporal key module 758 generates only one temporal key (e.g., a pairwise transient key or PTK) for all bands based on the same master key. Thus, all bands use the same master key and the same temporal key.

For example, the temporal key module 758 generates a single PTK for the 60 GHz band and the 2.4/5 GHz bands based on the same pairwise master key (PMK) as follows. The temporal key module 758 derives the single pairwise transient key (PTK) from the same PMK using a pseudo random function (PRF). PTK may be described as PRF (PMK, Nonces, Addresses, etc.). Further, PTK=KCK|KEK|TK. A single pairwise transient key security association (PTKSA) is established for all bands using the same PTK. A single group temporal key security association (GTKSA) is established for all bands using a single group temporal key (GTK). The same PTK and the same GTK are shared by all bands.

The GCMP encryption module 706 uses the same pairwise transient key (PTK) to encrypt data when the wireless device 700 communicates on the 60 GHz band. The GCMP encryption module 706 uses the same pairwise PTK to encrypt data when the wireless device 700 communicates on the 2.4/5 GHz bands.

For each band, when the PTK and the GTK are generated and stored in the encryption module 706, the high MAC module 720 creates the controlled port 722 and the uncontrolled port 724. The controlled port 722 and the uncontrolled port 724 are shared by all bands. The high MAC module 720 unblocks the controlled port 722 to securely transport encrypted data when the PTK and the GTK are generated and stored in the GCMP encryption module 706.

While different bands support different security algorithms, if all the bands support at least one common security algorithm, a single temporal key can be used for all the bands. Accordingly, when all the bands support at least one common security algorithm, the temporal key module 758 generates a single temporal key for all the bands using the MAC address of the high MAC module 620.

Thus, a multiband device operating in the transparent mode supports at least one security suite (e.g., pairwise cipher suite) that is common for all bands. Otherwise, the multiband device can use only the non-transparent mode. Further, when the multiband device operates in the transparent mode, the advertised security suites (e.g., pairwise cipher suite) for an alien band (i.e., a band other than the current band) are a subset of the advertised security suites for the current band.

Two multiband devices operating in the transparent mode negotiate/select the same security suite (e.g. pairwise cipher suite) for all bands when establishing multiband robust security network association (RSNA). RSNA establishment is performed in the current band once for all bands. A single pairwise master key security association (PMKSA), group master key security association (GMKSA), pairwise transient key security association (PTKSA), and group transient key security association (GTKSA) are established once for all bands.

A single packet number (PN) counter is associated with the PTKSA (GTKSA) for all bands. One controlled port and one uncontrolled port are shared by all bands. Once the PTK and GTK are installed, the controlled port is unblocked for all bands.

The security module performs Data encryption/decryption and MIC calculation transparently to different bands. The Data encryption/decryption and MIC calculation can be performed before data is passed to a particular band for transmission. Specifically, data to be transmitted can be encrypted without knowing which band is in use. Further, the data can be encrypted before it is forwarded to the low MAC modules for transmission. Encrypting the data beforehand reduces queuing delays.

Additional data that are not encrypted (Additional authentication data or AAD) are constructed to be transparent to different bands. MAC header fields that are different for different bands are masked to 0.

Figure 19:
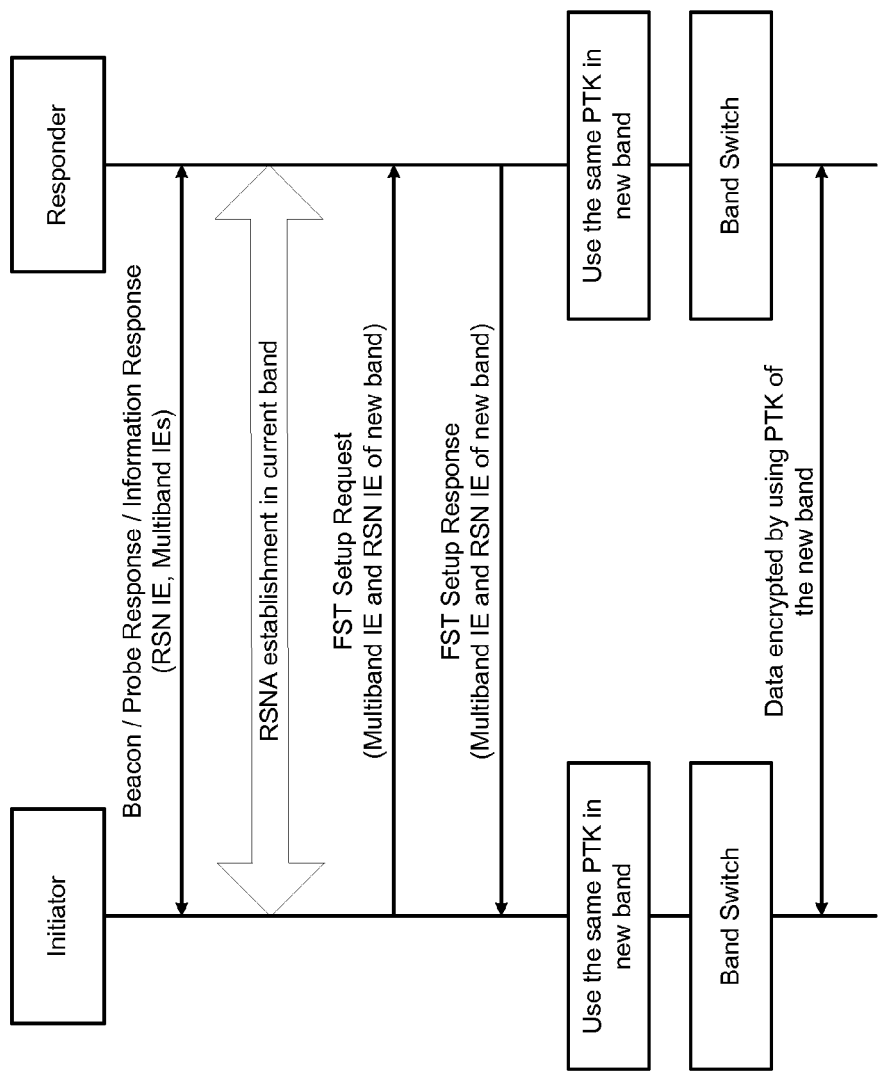
FIG. 19 depicts a multiband RSNA between an initiator and a responder in a transparent mode.

Referring now to FIG. 19, an example of multiband robust network security association (RSNA) using the transparent mode is shown. For example, both the initiator and the responder may be multiband STAs. Both the STAs exchange security capabilities via the RSN IE and multiband capabilities in the multiband IEs. For example, the multiband IEs may include FST modes and MAC addresses of the bands. Both the STAs may set the FST mode to 1 in the multiband IEs. Alternatively, both the STAs may set the STA MAC address present field to 0 in the multiband IEs.

Based on the capabilities exchanged, the STAs establish RSNA in the current band and generate a pairwise transient key security association (PTKSA) for the current band. When both the STAs support the transparent mode and support the same security algorithm, the STAs establish the RSNA in the current band using the transparent mode.

When the initiator decides to switch band to the new band, the initiator sends a FST setup request to the responder. The FST request includes a multiband IE and RSN IE with information of the new band. The responder receives the multiband information and the security capabilities of the new bands. When both the STAs agree that the transparent mode can be used to transfer session from the current band to the new band, the responder sends a FST setup response. A session transfer IE indicating a transparent session transfer capability may be included in FST setup response frame.

Subsequently, when the band is switched from the current band to the new band, both the STAs use the PTKSA already established in the current band for the new band. The pairwise cipher suit used by both STAs in the current band is supported by both STAs in the new band.

Figure 20:
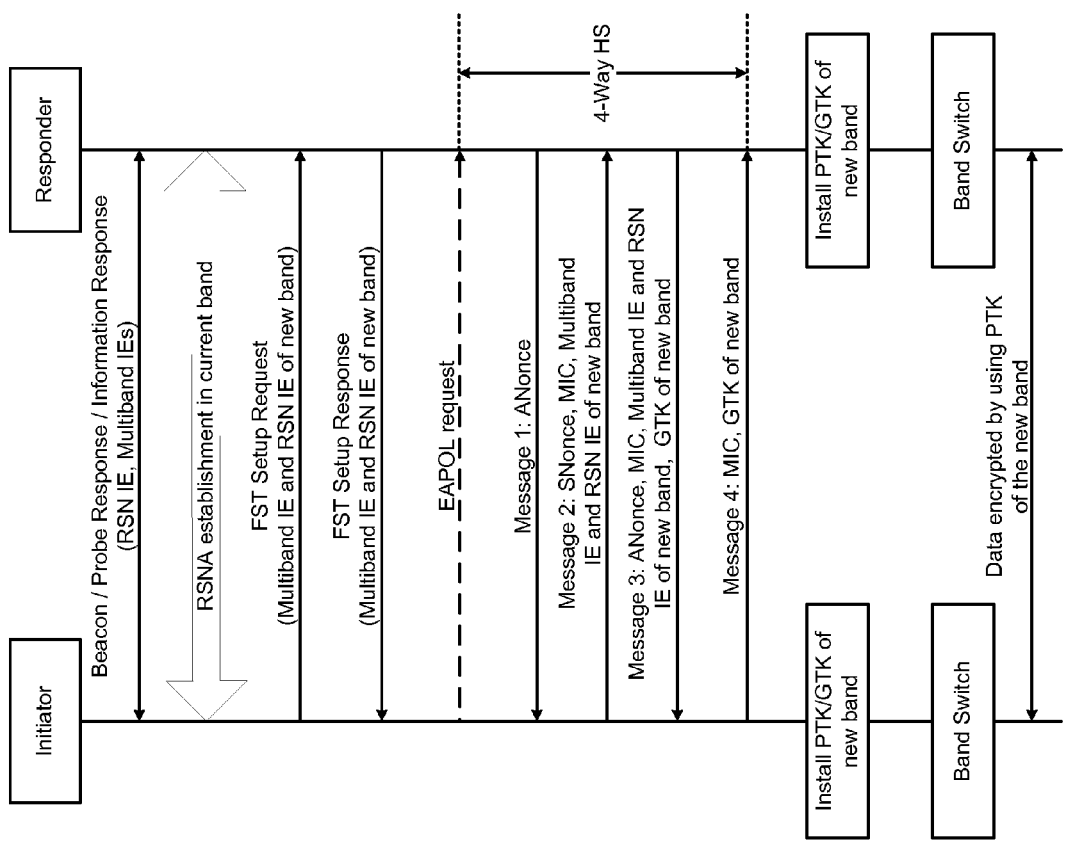
FIG. 20 depicts a multiband RSNA between an initiator and a responder in a non-transparent mode.

Referring now to FIG. 20, an example of multiband robust network security association (RSNA) using the non-transparent mode is shown. For example, both the initiator and the responder may be multiband STAs. Both the STAs exchange security capabilities via the RSN IE and multiband capabilities in the multiband IEs. For example, the multiband IEs may include FST modes and MAC addresses of the bands. At least one STA sets the FST mode to 0 in the multiband IEs. Alternatively, at least one STA sets the STA MAC address present field to 1 in the multiband IEs. Based on the capabilities exchanged, the STAs establish RSNA in the current band and generate a pairwise transient key security association (PTKSA) for the current band.

When the initiator decides to switch band to the new band, the initiator sends a FST setup request to the responder. The FST request includes a multiband IE and RSN IE with information of the new band. The responder receives the multiband information and the security capabilities of the new bands. When both the STAs agree that the non-transparent mode is to be used to transfer session from the current band to the new band, the responder sends a FST setup response. A session transfer IE indicating a non-transparent session transfer capability may be included in FST setup response frame.

Subsequently, the STAs perform a 4-way handshake in the current band to establish a temporal key for the new band. This is different than the multiband robust network security association (RSNA) using the transparent mode, which does not use a 4-way handshake to establish the temporal key for the new band as shown in FIG. 19. When using the non-transparent mode, in some implementations, the 4-way handshake may be performed during RSNA establishment in current band. Thus, the temporal key for the new band is established before switching bands. When the band is switched to the new band, the temporal key for the new band is ready for use to encrypt data in the new band.

A detailed description of advertising multiband RSN security capabilities and policies is now provided. Multiband devices may indicate (i.e., signal) multiband security capabilities in many ways. For example, an RSN IE for the current band may not include a band ID of the current band. In other words, if the RSN IE does not include a band ID, the RSN IE is for the current band. If the RSN IE includes a band ID, the RSN IE is for the band indicted by the band ID.

A multiband device may support different RSNA security suites in different bands. For example, a multiband device supporting both the 2.4/5 GHz bands and the 60 GHz band may support CCMP in the 2.4/5 GHz bands to communicate with a legacy single band device, which supports only CCMP. The multiband device may support GCMP in the 60 GHz band, which is the only choice in the 60 GHz band. The multiband device may support GCMP in the 2.4/5 GHz bands.

When two multiband devices establish RSNA, different bands may support different security suites. The security suits for all bands may be selected using one of two options. In option 1, different bands may use different security suites enabling more flexible implementation. In option 2, all bands use the same set of security suites, which simplifies multiband system design.

Figure 21:
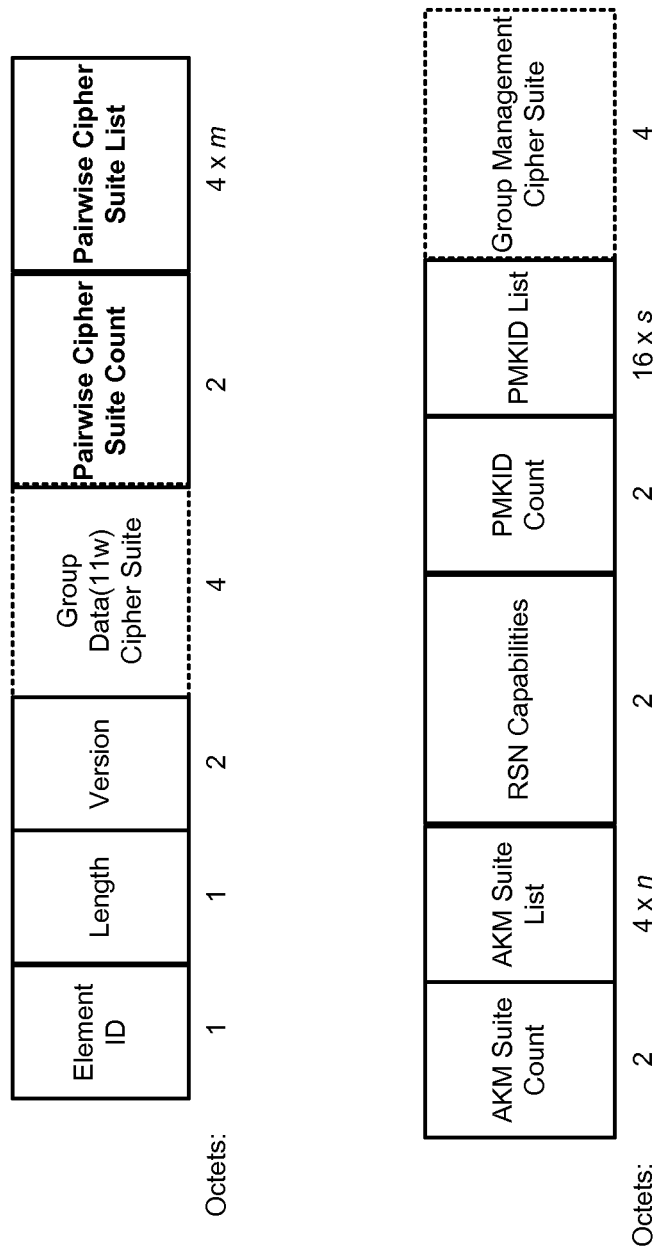
FIG. 21 depicts information elements with group cipher suit fields.

Referring now to FIG. 21, generally only one Group Data Cipher Suite and one Group Management Cipher Suite are allowed in an ESS/IBSS/PBSS. For example, an AP/PCP may select CCMP as Group Cipher Suite in the 2.4/5 GHz bands to support single band legacy devices and GCMP as Group Cipher Suite in the 60 GHz band, which is the only choice. These group cipher suites (shown dotted) are used in multicast/broadcast type communications.

The communication between two multiband STAs, however, is unicast type, where the pairwise cipher suites (shown highlighted) are used in switching bands. Accordingly, a multiband STA may use pairwise cipher only and may disable group cipher in an alien band if the STA does not support the group cipher used in the alien band.

Multiband devices may advertise multiband RSNA capabilities in many ways. The advertisement, negotiation, and selection functions described herein can be performed by the security modules of the multiband devices. When operating in the current band, a multiband device can advertise all supported security suites in the current band. Additionally, the multiband device can advertise the security suites that can be used in an alien band (or all bands) when FST is allowed.

For example, the advertised security suites may be all the supported security suites in the alien band. The advertised security suites may also include the security suites that can be supported by both the current band and the alien band or by all bands. The advertised security suites may also include a single selected security suite (or a set of security suites) for the alien band, or for all bands.

The multiband device may advertise multiband RSNA capabilities using one of the following options. In option 1, one RSN IE is used per band, and the band ID is appended to the RSN IE for the band. For example, a Band ID of the alien band is appended to the RSN IE for the alien band. In option 2, a security suite list or field (e.g. pairwise cipher suite) is added to the multiband IE to indicate the security suite(s) that can be used in the alien band. In option 3, instead of using one RSN IE per band, a single RSN IE is used. For example, a multiband security suite list or field is added to the RSN IE to indicate the security suite(s) that can be used in the alien band(s) or all bands.

Subsequently, the multiband devices may negotiate/select RSNA policies as follows. For example, a multiband device establishing RSNA with another multiband device can select a common security suite that can be supported by all bands if such a security suite exists.

Figure 22:
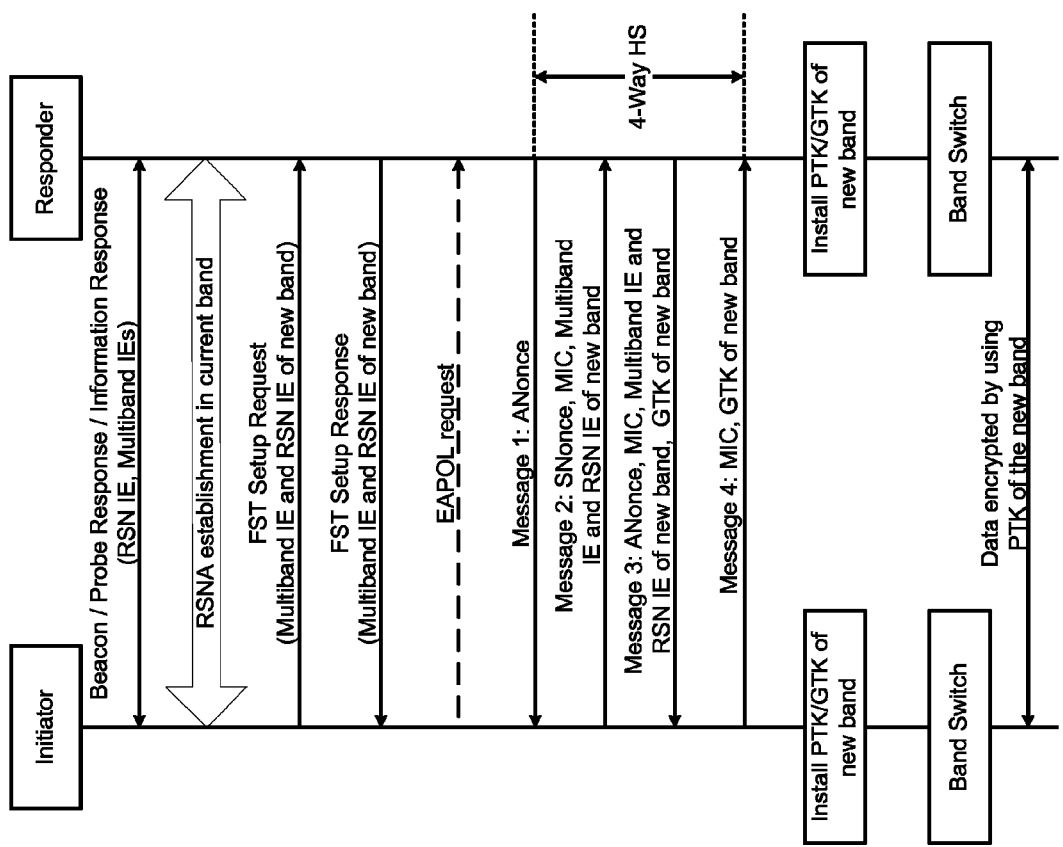
FIG. 22 shows an example of advertisement and negotiation of multiband RSNA capabilities between an initiator and a responder using a 4-way handshake.
Figure 23:
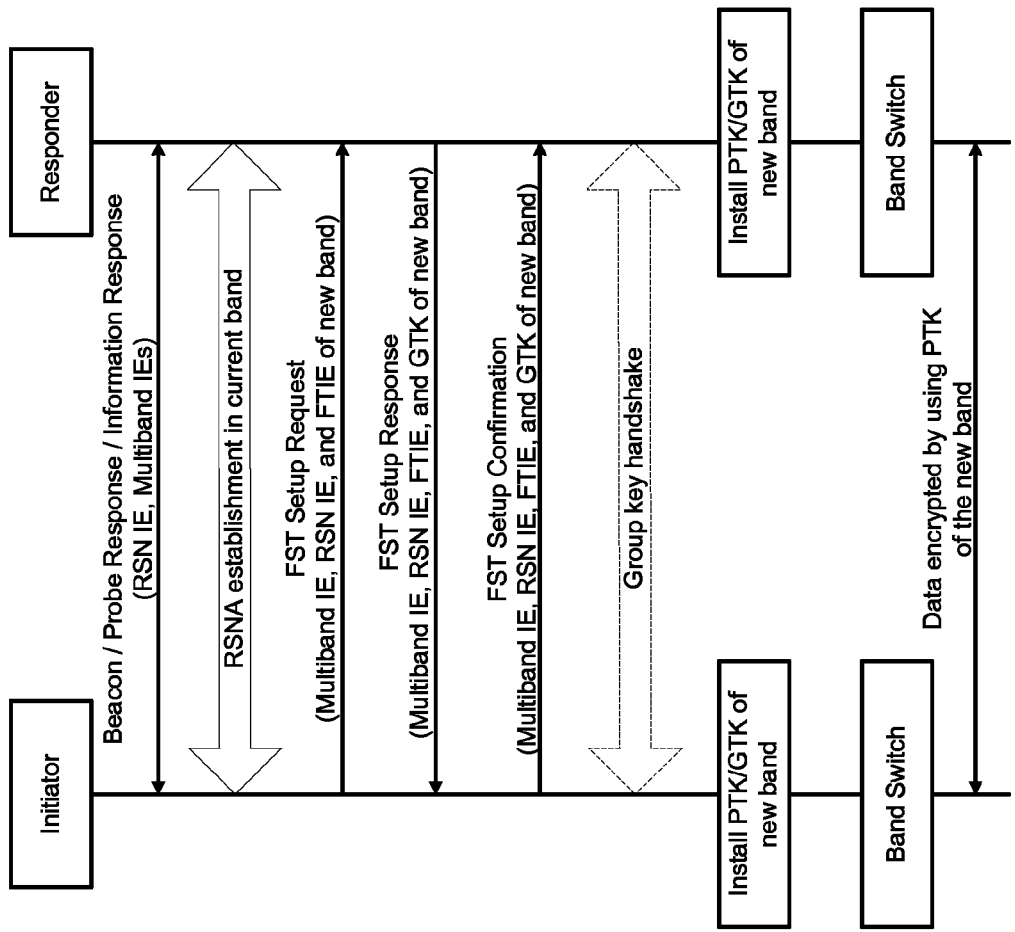
FIG. 23 shows an example of advertisement and negotiation of multiband RSNA capabilities between an initiator and a responder where a 4-way handshake is combined with FST setup.

Referring now to FIGS. 22 and 23, examples of advertisement and negotiation of multiband RSNA capabilities are shown. In FIG. 22, in the beacon/probe response/information response exchange, the RSN IE associated with the current band is exchanged. RSN IEs associated with other bands are not exchanged to avoid confusion. After the RSNA is established for the current band, FST setup frames are exchanged, followed by a 4-way handshake in the current band to establish temporal keys for the new band. In the FST setup frames, RSN IE associated with a band other than the current band is bound together with the corresponding multiband IE.

In FIG. 23, the 4-way handshake is combined with the FST setup. The FST setup frames include a Fast BSS Transition information element (FTIE). The FST setup frames are encrypted using the temporal key generated for the current band during the RSNA establishment. The FST setup frames are used instead of a 4-way handshake to establish security (i.e., to perform authentication) for the new band before switching bands.

Figure 24:
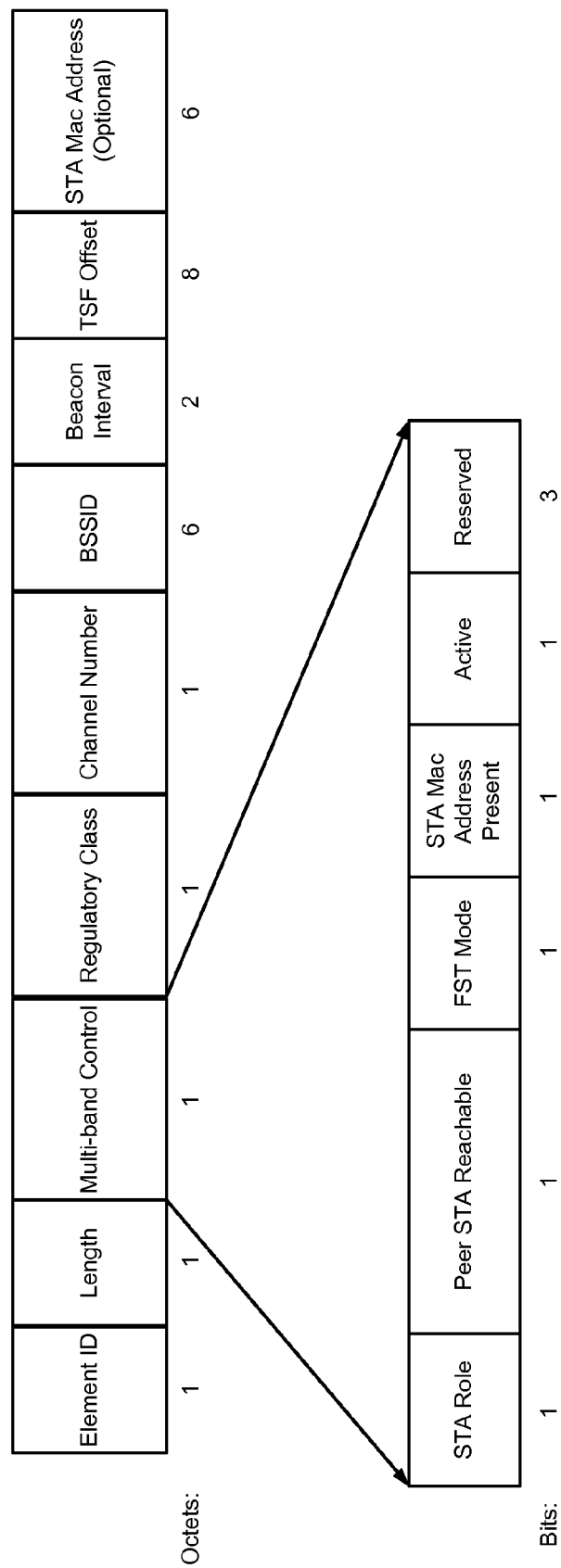
FIG. 24 depicts a multiband IE.

Referring now to FIG. 24, a multiband information element may be used instead of using multiple RSN IEs. In the multiband IE, pairwise cipher suit count and pairwise cipher suit list fields are newly added. Group cipher suits for the associated band may also be included in the multiband element.

Figure 25:
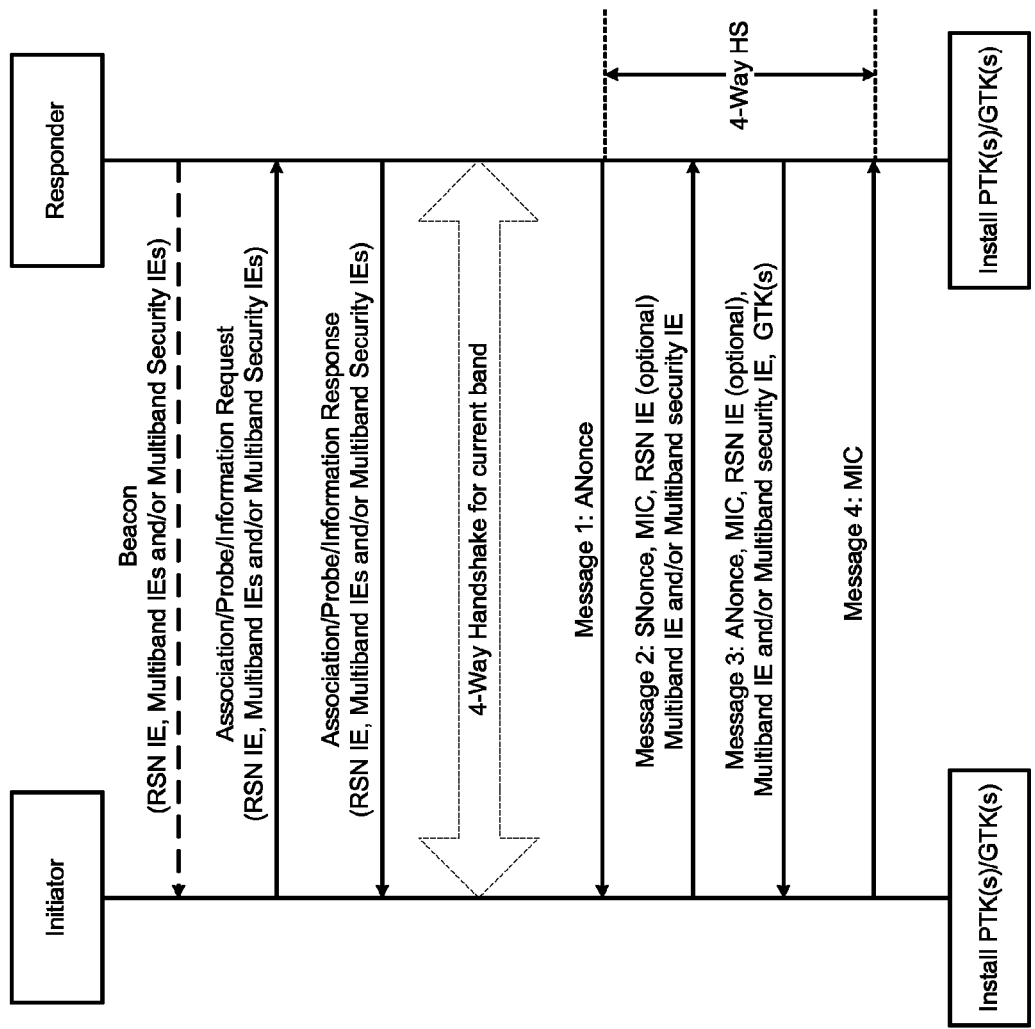
FIG. 25 shows an example of advertisement and negotiation of multiband RSNA capabilities between an initiator and a responder using the multiband IE of FIG. 24 in non-transparent mode.
Figure 26:
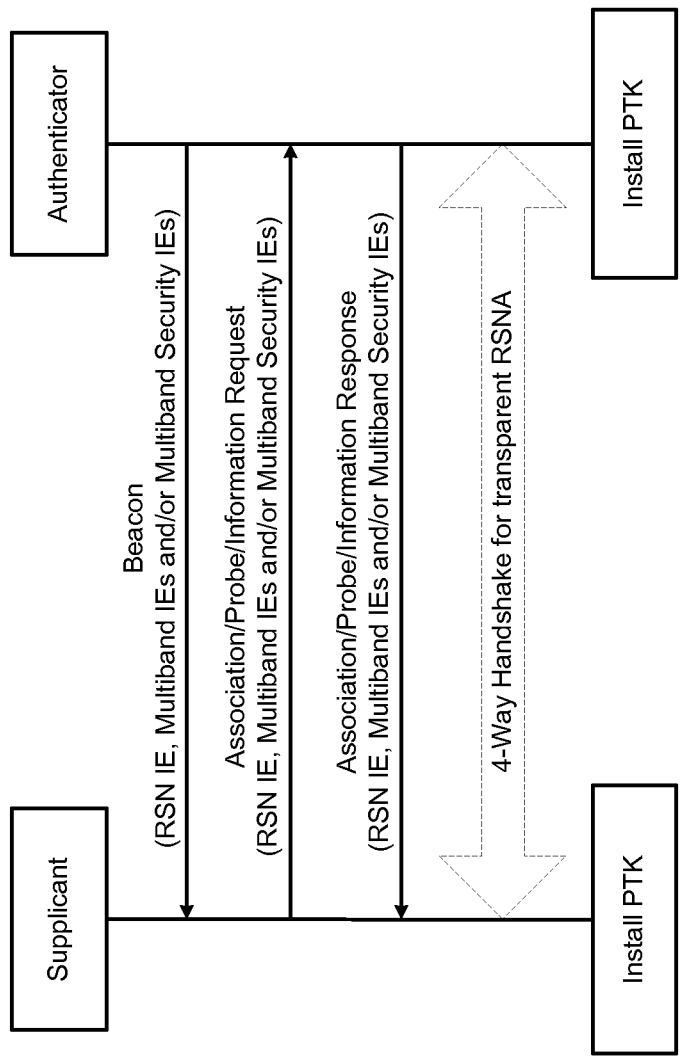
FIG. 26 shows an example of advertisement and negotiation of multiband RSNA capabilities between an initiator and a responder using the multiband IE of FIG. 24 in transparent mode.
Figure 27:
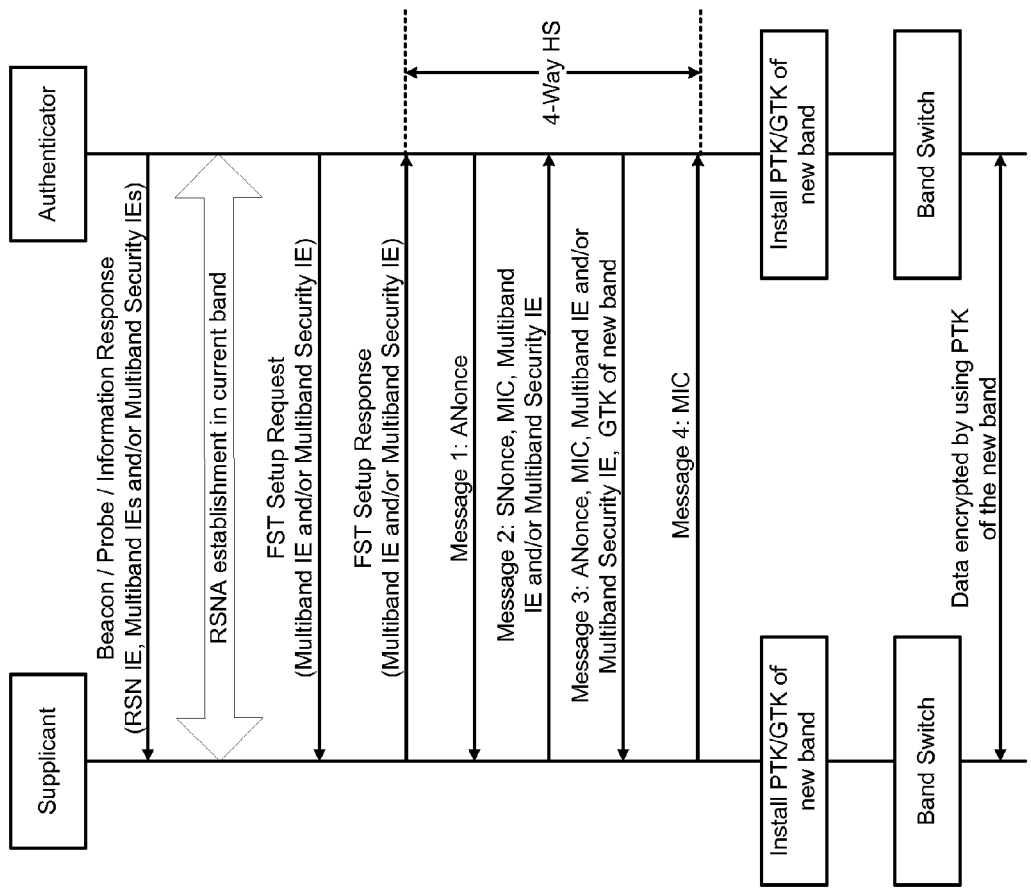
FIG. 27 shows an example of advertisement and negotiation of multiband RSNA capabilities between an initiator and a responder using the multiband IE of FIG. 24 in non-transparent mode.

Referring now to FIGS. 25-27, examples of advertisement and negotiation of multiband RSNA capabilities using the multiband IE of FIG. 24 are shown. FIGS. 25 and 27 show the non-transparent mode. FIG. 26 shows the transparent mode.

In FIG. 25, the RSN IE includes the security suit information of the current band. The multiband IEs include the security suit information of other supported bands. In the non-transparent mode, separate pairwise transient key security associations (PTKSAs) for different bands are established using a 4-way handshake in the current band. Subsequently, a 4-way handshake for a band other than the current band is performed, where a RSN IE is included if a joint RSNA establishment for the current band and the new band is performed.

In FIG. 26, in the transparent mode, a single pairwise transient key security association (PTKSA) for all supported bands is established in a 4-way handshake. A session transfer information element or a flag indicating transparent/non-transparent mode may be included in association/probe/information request and message 2 and message 3 of the 4-way handshake. In FIG. 27, in the non-transparent mode, a 4-way handshake for the new band is performed in the current band as shown.

In FIGS. 25-27, a STA capable of operating in multiple bands uses RSN IE to advertise supported security suites and RSNA policies in the current band. Optionally, the security suites and RSNA policies for all bands are included in the RSN IE. The STA uses a multiband IE or a new multiband security IE to advertise supported security suites and RSNA policies in the band associated with the multiband IE. Only the security suites and RSNA policies that are supported, needed, and allowed after band/session transfer to the associated band are included in the multiband IE or the multiband security IE. For example, authentication/PMK suites may not be included if a single authentication is performed for all bands.

The RSN IE, the multiband IE, and/or the multiband security IE can be exchanged in many ways. For example, these IEs can be included in beacon, probe response, and information response frames to advertise RSNA policies for current band and alien band(s). These IEs can also be included in information request or probe request frames. These IEs can be included in (re)association request and/or (re)association response frames for RSNA policy negotiation for current band and alien band(s). These IEs can also be included in message 2 and message 3 of 4-way handshake for RSNA policy negotiation and verification. These IEs can also be included in FST request, FST response, (and/or FST confirmation) frames for RSNA policy negotiation and verification.

Some of the novel features of the present disclosure and their implementation details are summarized below. With respect to mmWave Beacon, an "RSNA" subfield with a length of 1 bit is included in mmWave Capability field. The RSNA subfield is set to 1 if a dot11RSNAEnabled variable is true. Otherwise, the RSNA subfield is set to 0. When the RSNA subfield is set to 1, a new STA wishing to establish RSNA with the PCP should send Probe Request or Information Request to PCP to get the detailed RSN IE.

With respect to RSN information element, a "Band ID" field with a length of 1 octet is appended to the end of the RSN element. The Band ID field indicates the band for which the RSN IE applies. A "Joint Multi-band RSNA" subfield with a length of 1 bit is included in RSN Capabilities field. A STA sets the Joint Multi-band RSNA subfield to 1 to indicate that the STA supports the Joint Multi-band RSNA. Otherwise, the subfield is set to 0.

The elements of PTKSA, GTKSA, and STKSA are as follows: The PTKSA consists of the following elements: PTK, Pairwise cipher suite selector, Supplicant MAC address or non-AP STA's MAC address, Authenticator MAC address or BSSID, Key ID, Band ID, and, if FT key hierarchy is used, then R1KH-ID, S1KH-ID, and PTKName.

A GTKSA consists of the following elements: Direction vector (whether the GTK is used for transmit or receive), Group cipher suite selector, GTK, Authenticator MAC address, Key ID, Band ID, and all authorization parameters specified by local configuration (this can include parameters such as the STA's authorized SSID). The STKSA consists of the following elements: STK, Pairwise cipher suite selector, Initiator MAC address, Peer MAC address, KeyID, and Band ID.

With respect to Multi-band RSNA, a STA is Multi-band capable and RSNA-capable if the values of both its local MIB variables dot11MultibandSupportEnabled and dot11RSNAEnabled are true. A STA that is Multi-band capable and RSNA-capable may include the Multi-band elements and RSN elements associated with the supported bands in Beacon and Announce frames, and shall include the Multi-band elements and RSN elements associated with all supported bands in Probe Response and Information Response frames. Each included RSN element shall specify all the cipher suites enabled by the STA's policy for the associated band. A STA shall not advertise any cipher suite that is not enabled.

When a STA's SME wants to set up an RSNA with a peer STA for a supported band other than the current operating band, but does not know the peer STA's policy for the supported band, the STA must first obtain the peer STA's policy for the supported band by using a Probe Request frame or Information Request frame. If the STA does not have an existing PMKSA with the peer STA, the STA shall first establish a PMKSA with the peer STA in the current operating band, and then use the PMKSA to create a PTKSA with the peer STA for the supported band. If the STA has already established a PMKSA with the peer STA, the PMKSA shall be used to create a PTKSA between the two STAs for the supported band.

With the PMK in place, the STA pair wishing to establish an RSNA for a supported band other than the current operating band may start a 4-Way Handshake in the current operating band to negotiate a pairwise cipher suite for the supported band and establish a PTKSA and a GTKSA for the supported band. Message 2 and Message 3 of the 4-Way Handshake convey the RSN element and MAC address associated with the supported band.

The RSN element in Message 2 includes the selected pairwise cipher suite for the supported band. Message 3 includes the RSN element associated with the supported band that the STA would send in a Beacon, Announce, Probe Response, or Information Response frame. Message 3 may optionally include a second RSN element that indicates the STA's pairwise cipher suite assignment for the supported band.

If the Joint Multi-band RSNA subfield of the RSN Capabilities field is set to 1 for both STAs of a STA pair, the STA pair may use a single 4-Way Handshake to negotiate pairwise cipher suites and establish PTKSAs and GTKSAs for both the current operating band and other supported band(s). Message 2 and Message 3 of the 4-Way Handshake may convey the RSN elements associated with both the current operating band and other supported band(s). Message 2 and Message 3 may also include the MAC address(es) associated with the supported band(s) other than the current operating band.

The RSN elements in Message 2 include the selected pairwise cipher suites for both the current operating band and other supported band(s). Message 3 includes the RSN elements associated with both the current operating band and other supported band(s) that the STA would send in a Beacon, Announce, Probe Response, or Information Response frame. Message 3 may optionally include additional RSN elements that indicate the STA's pairwise cipher suite assignment for the current operating band and other supported band(s). KCK and KEK associated with the current operating band shall be used in the 4-Way Handshake.

The PTK for a supported band other than the current operating band shall be derived by using: PTK={KCK, KEK, TK}←PRF-384 (PMK, "Pairwise key expansion", Min(AA, SPA)||Max(AA, SPA)||Min(Anonce, Snonce)||Max(Anonce, Snonce)||Band ID). AA is Authenticator's MAC address associated with the supported band. SPA is Supplicant's MAC address associated with the supported band.

The same GMKSA shall be used for all supported bands. The GTK for a supported band other than the current operating band shall be derived by using: {GTK}=PRF-128 (GMK, "Group key expansion", AA||Gnonce||Band ID). AA is Authenticator's MAC address associated with the supported band.

In 4-Way Handshake Message 2, the description of Key Data field is modified as follows: Key Data=included RSNIE, where the RSNIE is the sending STA's RSNIE for PTK generation for the current operating band or peer RSNIE for the current operating band. Or, if a dot11MultibandSupportEnabled variable is true, the Key Data is the sending STA's RSNIE and MAC address KDE for PTK generation for a supported band other than the current operating band. Or, if the Joint Multi-band RSNA subfield is set to 1, the Key Data is the sending STA's RSNIEs and MAC address KDE(s) for PTK generation for both the current operating band and other supported band(s). Lifetime of SMK and SMKID is used for STK generation.

In 4-Way Handshake Message 3, the description of Key Data field is modified as follows: Key Data=For PTK generation for the current operating band, the AP's Beacon/Probe Response frame's RSN element for the current operating band, and, optionally, a second RSN element that is the Authenticator's pairwise cipher suite assignment for the current operating band, and, if a group cipher has been negotiated, the encapsulated GTK and the GTK's key identifier for the current operating band.

Or, if a dot11MultibandSupportEnabled variable is true, the Key Data=for PTK generation for a supported band other than the current operating band, the Authenticator's Beacon/Annonce/Probe Response/Information Response frame's RSNIE associated with the supported band and the MAC address KDE associated with the supported band, and optionally, a second RSNIE that is the Authenticator's pariwise cipher suite assignment for the supported band, and, if group cipher for the supported band is negotiated, the encapsulated GTK and the GTK's key identifier for the supported band.

Or, if the Joint Multi-band RSNA subfield is set to 1, the Key Data=for PTK generation for both the current operating band and other supported band(s), the Authenticator's Beacon/Annonce/Probe Response/Information Response frame's RSNIEs associated with both the current operating band and other supported band(s), and the MAC address KDE(s) associated with the supported band(s) other than the current operating band, and optionally, additional RSNIEs that are the Authenticator's pairwise cipher suite assignment for both the current operating band and other supported band(s).

If group ciphers for both the current operating band and other supported band(s) are negotiated, the encapsulated GTKs and the GTK's key identifiers for both the current operating band and other supported band(s). For STK generation Initiator RSNIE, Lifetime of SMK is used. If the Extended KeyID for Unicast subfield of the RSN Capabilities field is set to 1, then the Authenticator includes the Key ID KDE with the assigned key identifier for the current operating band.

Or, if a dot11MultibandSupportEnabled variable is true, the Authenticator includes the Key ID KDE with the assigned key identifier for a supported band other than the current operating band. Or, if the Joint Multi-band RSNA subfield is set to 1, the Authenticator includes the Key ID KDEs with the assigned key identifiers for both the current operating band and other supported band(s).

For 4-Way Handshake Message 4, other options are: (1) include Band ID in all KDEs, allowing different bands to have different PMKs and SMKs. (2) Joint Multi-band RSNA may not include the current operating band (KCK and KEK associated with the current operating band is always used in 4-Way Handshake; or KCK and KEK associated with the smallest Band ID is used in 4-Way Handshake).

Further, in option (3), when Joint Multi-band RSNA is used, a field in EAPOL-Key frames or a new KDE may be used to indicate the number of bands for the Joint RSNA setup; Message 2 and 3 shall include this field/KED. Message 2 may include the number of intended bands, and Message 3 may include the number of accepted bands.

Further, in option (4), Supplicant may include RSNIEs of all intended bands in Message 2. Authenticator may reject RSNA setup requests for some of the bands (or all intended bands). Authenticator only includes RSNIEs of accepted bands in Message 3 and/or includes Authenticator's pairwise security suite assignments of accepted bands in Message 3.

Authenticator may include RSNIEs of all intended bands as in Beacon/Probe Response, and also include additional RSNIEs with NULL pairwise suite assignment for rejected bands in Message 3. Authenticator may include Error KDE(s) in Message 3 to indicate rejected/unacceptable bands.

Authenticator may send error messages to Supplicant regarding to the rejected bands. Authenticator may initiate Disauthentication primitive and send Disauthentication frame to Supplicant to specify the failed RSNA setup in rejected bands. Authentication may simply reject all bands and ask Supplicant to retry each band one-by-one. If Authenticator rejects the current operating band, it shall reject all other bands, too.

Further, in option (5), other management/action frames like FST request, response, and confirmation frames may be used to replace 4-Way Handshake messages to convey ANonce, SNonce, MAC address KDE, GTK KDE, KeyID KDE etc. The management and action frames can be protected by the PTK associated with the current operating band.

In Multi-band information element, a "Pairwise Cipher Suite Count (optional)" field with a length of 2 octets and a "Pairwise Cipher Suite List (optional)" field with a length of 4*m octets in the Multi-band element are included. Also, a "Pairwise Cipher Suite Present" subfield with a length of 1 bit is included in the Multi-band control field and defined as follows: "The Pairwise Cipher Suite Present field indicates whether the Pairwise Cipher Suite Count field and the Pairwise Cipher Suite List field are present in the Multi-band element. If set to one, the Pairwise Cipher Suite Count field and the Pairwise Cipher Suite List field are present. If set to zero, the Pairwise Cipher Suite Count field and the Pairwise Cipher Suite List field are not present."

In Multi-band RSNA, a STA is Multi-band capable and RSNA-capable if the values of both its local MIB variables dot11MultibandSupportEnabled and dot11RSNAEnabled are true. A STA that is Multi-band capable and RSNA-capable shall set the Pairwise Cipher Suite Present field of the Multi-band element to 1 and shall include the Pairwise Cipher Suite Count field and the Pairwise Cipher Suite List field in the multi-band element. The STA may include the Multi-band element in the mmWave Beacon and Announce frames, and shall include the Multi-band element in Beacon, Probe Response and Information Response frames.

The Multi-band element shall specify all the pairwise cipher suites enabled by the STA's policy for the associated band. A STA shall not advertise any cipher suite that is not enabled. A Multi-band capable and RSNA capable STA shall also include the Multi-band element in (Re)Association Request frame and in Message 2 and Message 3 of the 4-Way Handshake.

When a STA's SME wants to set up an RSNA with a peer STA for a supported band, but does not know the peer STA's policy for the supported band, it must first obtain the peer STA's policy for the supported band by using a Probe Request frame or Information Request frame. The STA initiating RSNA establishment for a supported band is called initiator and the targeted STA of the RSNA establishment is called responder.

A multi-band capable STA may create its own group key(s) for one or more supported bands. If the STA uses different MAC addresses in different bands, different GTK-SAs are created for different bands. If the STA uses a same MAC address in all supported bands, a single GTKSA is created for all supported bands.

In Non-transparent multi-band RSNA, an initiator can establish a non-transparent multi-band RSNA with a responder for a supported band other than the current operating band. The two STAs use a same PMKSA for both the supported band and the current operating band, and creates different PTKSAs for different bands.

If the initiator does not have an existing PMKSA with the responder, it shall first establish a PMKSA with the responder in the current operating band, and then use the PMKSA to create a PTKSA with the responder for the supported band. If the initiator has already established a PMKSA with the responder, the PMKSA shall be used to create a PTKSA between the two STAs for the supported band.

With the PMK in place, the STA pair wishing to establish a non-transparent multi-band RSNA for the supported band may start a 4-Way Handshake in the current operating band to negotiate a pairwise cipher suite for the supported band and establish a PTKSA for the supported band. Message 2 and Message 3 of the 4-Way Handshake convey the Multi-band element associated with the supported band. The Multi-band element in Message 2 includes the selected pairwise cipher suite for the supported band.

Message 3 includes the Multi-band element that the STA would send in a Beacon, mmWave Beacon, Announce, Probe Response or Information Response frame. Message 3 may optionally include a second Multi-band element that indicates the STA's pairwise cipher suite assignment for the supported band.

If the Joint Multi-band RSNA subfield of the RSN Capabilities field is set to 1 for both STAs of a STA pair and at least one of the STAs uses different MAC addresses for different bands, the STA pair may use a single 4-Way Handshake to negotiate pairwise cipher suites and establish PTKSAs for both the current operating band and the other supported band(s).

Message 2 and Message 3 of the 4-Way Handshake convey the RSN element and the Multi-band element(s). The RSN element in Message 2 includes the selected pairwise cipher suite for the current operating band and the Multi-band element(s) in Message 2 include the selected pairwise cipher suite(s) for the other supported band(s). Message 3 includes the RSN element and the Multi-band elements that the STA would send in a Beacon, mmWave Beacon, Announce, Probe Response or Information Response frame.

Message 3 may optionally include a second RSN element and multi-band element(s) that indicate the STA's pairwise cipher suite assignments for the current operating band and the other supported band(s). KCK and KEK associated with the current operating band shall be used in the 4-Way Handshake.

In transparent multiband RSNA, an initiator can establish a transparent multiband RSNA with a responder for both the current operating band and the other supported band(s) if (1) both STAs use the same MAC address in the current operating band and the other supported band(s); and (2) at least one common pairwise cipher suite is supported by both STAs in the current operating band and the other supported band(s).

Two STAs that establish a transparent multi-band RSNA create one PMKSA and one PTKSA for both the current operating band and other supported band(s). If the initiator does not have an existing PMKSA with the responder, it shall first establish a PMKSA with the responder in the current operating band, and then use the PMKSA to create a PTKSA with the responder for all involved bands. If the initiator has already established a PMKSA with the responder, the PMKSA shall be used to create a PTKSA between the two STAs for all involved bands.

With the PMK in place, the STA pair wishing to establish a transparent multi-band RSNA for both the current operating band and the other supported band(s) may start a 4-Way Handshake in the current operating band to negotiate a pairwise cipher suite for all involved bands, and also establish a single PTKSA for all involved bands. Message 2 and Message 3 of the 4-Way Handshake convey the RSN element and the Multi-band element(s).

The RSN element and the Multi-band element(s) in Message 2 include one selected pairwise cipher suite for all involved bands. Message 3 includes the RSN element and the Multi-band element(s) that the STA would send in a Beacon, mmWave Beacon, Announce, Probe Response or Information Response frame. Message 3 may optionally include a second RSN element and Multi-band elements that indicate the STA's pairwise cipher suite assignment for all involved bands.

In 4-Way Handshake Message 2, the description of the Key Data field is modified as follows: Key Data=included RSNIE, where the RSNIE is the sending STA's RSNIE for PTK generation for the current operating band or peer RSNIE for the current operating band. Or, if a dot11MultibandSupportEnabled variable is true, the Key Data is the sending STA's Multi-band element for PTK generation for a supported band other than the current operating band.

Or, if a dot11MultibandSupportEnabled variable is true and both the Authenticator and the Supplicant use the same MAC address in the current operating band and the other supported band(s), the Key Data is the sending STA's RSN element and Multi-band element(s) for generating a single PTK for all involved bands.

Or, if a dot11MultibandSupportEnabled variable is true and the Joint Multi-band RSNA subfield of the RSN capabilities field is set to 1 for both the Authenticator and the Supplicant, and either the Authenticator or the Supplicant uses different MAC addresses for different bands, the Key Data is the sending STA's RSN element and Multi-band element(s) for generating a different PTK for each involved band. Lifetime of SMK and SMKID is used for STK generation.

In 4-Way Handshake Message 3, the description of the Key Data field is as follows: Key Data=For PTK generation for the current operating band, the AP's Beacon/Probe Response frame's RSN element for the current operating band, and, optionally, a second RSN element that is the Authenticator's pairwise cipher suite assignment for the current operating band, and, if a group cipher has been negotiated, the encapsulated GTK and the GTK's key identifier for the current operating band.

Or, if a dot11MultibandSupportEnabled variable is true, the Key Data=for PTK generation for a supported band other than the current operating band, the Authenticator's Beacon/mmWave Beacon/Announce/Probe Response/Information Response frame's Multi-band element associated with the supported band, and optionally, a second Multi-band element that is the Authenticator's pairwise cipher suite assignment for the supported band, and, if group cipher for the supported band is negotiated, the encapsulated GTK and the GTK's key identifier for the supported band.

Or, if a dot11MultibandSupportEnabled variable is true and both the Authenticator and the Supplicant use the same MAC address in the current operating band and the other supported band(s), the Key Data=for generating a single PTK for all involved bands, the Authenticator's Beacon/mmWave Beacon/Announce/Probe Response/Information Response frame's RSN element and Multi-band element(s), and optionally, additional RSN element and Multi-band element(s) that indicate the Authenticator's assignment of one pairwise cipher suite for all involved bands; if a group cipher for all involved bands is negotiated, the encapsulated GTK and the GTK's key identifier for all involved bands.

Or, if a dot11MultibandSupportEnabled variable is true and the Joint Multi-band RSNA subfield is set to 1 for both the Authenticator and Supplicant, and either the Authenticator or the Supplicant uses different MAC addresses for different bands, the Key Data=for generating different PTKs for the current operating band and other supported band(s), the Authenticator's Beacon/mmWave Beacon/Announce/Probe Response/Information Response frame's RSN element and Multi-band element(s), and optionally, additional RSN element and Multi-band elements that are the Authenticator's pairwise cipher suite assignments for one or more involved bands. If group ciphers for the involved bands are negotiated, the encapsulated GTKs and the GTK's key identifiers for the involved bands.

For STK generation Initiator RSNIE, Lifetime of SMK is used. If the Extended KeyID for Unicast subfield of the RSN Capabilities field is set to 1 for both the Authenticator/STA_I and Supplicant/STA_P, then the Authenticator/STA includes the Key ID KDE with the assigned key identifier for the current operating band; or if a dot11MultibandSupportEnabled variable is true, the Authenticator includes the Key ID KDE(s) with the assigned key identifier(s) for one or more supported bands.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network device comprising:
a security module configured to establish, in response to the network device being capable of operating in a first frequency band and a second frequency band, and in response to the network device operating in the first frequency band, security for both the first frequency band and the second frequency band by performing a single authentication in the first frequency band prior to the network device switching operation from the first frequency band to the second frequency band; and
a session transfer module configured to transfer, subsequent to the network device switching operation from the first frequency band to the second frequency band, a communication session of the network device from the first frequency band to the second frequency band,
wherein the communication session of the network device resumes in the second frequency band using the security established for the second frequency band (i) during the operation of the network device in the first frequency band, and (ii) prior to the network device switching operation from the first frequency band to the second frequency band; and
wherein the security module is configured to
advertise first security capabilities and policies of the network device,
receive second security capabilities and policies of a remote device, and
perform the single authentication based on (i) the first security capabilities and policies of the network device, and (ii) the second security capabilities and policies of the remote device.

2. The network device of claim 1, wherein:
the network device is capable of communicating with the remote device in the first frequency band and the second frequency band; and
the network device and the remote device are capable of using one or more security suites to operate in the first frequency band and the second frequency band.

3. The network device of claim 1, wherein the security module is configured to perform the single authentication by creating a single master key for the first frequency band and the second frequency band and by creating a different temporal key for each of the first frequency band and the second frequency band.

4. The network device of claim 1, wherein the security module is configured to perform the single authentication by creating a single master key for the first frequency band and the second frequency band and by creating a single temporal key for each of the first frequency band and the second frequency band.

5. The network device of claim 1, wherein the security module is configured to:
perform, in response to the network device operating in a first mode, the single authentication by creating a single master key for the first frequency band and the second frequency band and by creating a different temporal key for each of the first frequency band and the second frequency band; and
perform, in response to the network device operating in a second mode, the single authentication by creating a single master key for the first frequency band and the second frequency band and by creating a single temporal key for each of the first frequency band and the second frequency band,
wherein the second mode is different than the first mode.

6. The network device of claim 1, wherein the security module is configured to:
advertise multiband robust security network association (RSNA) capabilities and policies using
(i) a robust security network information element (RSN IE) per frequency band, wherein the RSN IE includes a band identifier for each respective frequency band, or
(ii) a multiband information element having security suite information;
negotiate and select the multiband robust security network association (RSNA) capabilities and policies via a four-way handshake message with a remote device; and
establish security for all frequency bands via the single authentication,
wherein the single authentication includes a single robust security network association (RSNA).

7. The network device of claim 6, wherein the security module is configured to establish security for the first frequency band and the second frequency band using the four-way handshake with the remote device while the network device communicates with the remote device via the first frequency band.

8. The network device of claim 1, wherein the security module further comprises a temporal key generation module configured to:
generate a first temporal key for the first frequency band based on a media access control (MAC) address associated with the first frequency band, and
generate a second temporal key for the second frequency band based on a media access control (MAC) address associated with the second frequency band,
wherein the first temporal key and the second temporal key are derived from a single master key.

9. The network device of claim 8, further comprising:
a first encryption module configured to use the first temporal key to encrypt data to be transmitted via the first frequency band; and
a second encryption module configured to use the second temporal key to encrypt data to be transmitted via the second frequency band.

10. The network device of claim 9, wherein:
the first encryption module is configured to encrypt data using a Galois/Counter Mode Protocol (GCMP) in response to the first frequency band being a 60 GHz band; and
the second encryption module is configured to encrypt data using a counter mode (CTR) with cipher-block chaining (CBC) message authentication code protocol (CCMP) or the GCMP in response to the second frequency band including a 2.4 GHz band or a 5 GHz band.

11. The network device of claim 1, wherein:
the security module further comprises a temporal key generation module configured to generate a single temporal key for the first frequency band and the second frequency band based on (i) a single master key and (ii) a single media access control (MAC) address associated with the first frequency band and the second frequency band; and
the network device further comprising:
an encryption module configured to use the single temporal key to encrypt data to be transmitted via at least one of the first frequency band and the second frequency band.

12. The network device of claim 8, wherein:
the security module is configured to generate the second temporal key based on one or more of:
a band identifier, which indicates that the second frequency band is supported by both the network device and a remote device with which the network device communicates;
media access control (MAC) addresses of both the network device and the remote device for the second frequency band; and
a security algorithm for the second frequency band supported by both the network device and the remote device; or
the security module is configured to generate the second temporal key based on:
information exchanged with the remote device in the first frequency band via at least one of a beacon frame, an association frame, an announce frame, a fast session transfer (FST) setup frame, and a four-way handshake, wherein the information includes at least one of:
an identification of a different frequency band than the first frequency band supported by the remote device,
a media access control (MAC) address of the remote device for the different frequency band, and
a security algorithm supported by the different frequency band.

13. The network device of claim 1, wherein in response to the network device using a tunneled direct link setup (TDLS) to associate with a remote device operating in the first frequency band,
the security module is configured to establish security for the second frequency band by tunneling, through an access point, messages associated with a TDLS peer-key handshake, and
wherein the security module further comprises a temporal key generation module configured to, without using a master key, generate a temporal key for the second frequency band based on the messages associated with the TDLS peer-key handshake.

14. The network device of claim 1, further comprising:
a first physical layer (PHY) module configured to operate in the first frequency band;
a second physical layer (PHY) module configured to operate in the second frequency band;
a first media access control (MAC) module configured to communicate with the first PHY module in the first frequency band;
a second MAC module configured to communicate with the second PHY module in the second frequency band; and
a third MAC module configured to communicate with the first MAC module in the first frequency band and configured to communicate with the second MAC module in the second frequency band.

15. The network device of claim 14, wherein in response to the network device and a remote device supporting operation in a transparent mode, the security module is configured to generate a single temporal key for the first frequency band and the second frequency band based on a single MAC address associated with the first frequency band and the second frequency band prior to the network device switching operation from the first frequency band to the second frequency band.

16. The network device of claim 15, wherein the third MAC module further comprises an encryption module configured to:
encrypt data to be transmitted via at least one of the first PHY module and the second PHY module using the single temporal key, and generate encrypted data before the encrypted data is output to at least one of the first MAC module and the second MAC module.

17. The network device of claim 15, wherein the third MAC module includes the session transfer module configured to transfer the communication session from the first frequency band to the second frequency band, wherein the communication session resumes in the second frequency band using the single temporal key established prior to the network device switching operation from the first frequency band to the second frequency band.

18. The network device of claim 15, wherein the security module is configured to:
negotiate security algorithms with the remote device, and
select one of the security algorithms for encrypting data to be transmitted via at least one of the first frequency band and the second frequency band.

19. The network device of claim 14, wherein in response to the network device supporting operation in a transparent mode and in response to a remote device supporting operation in a non-transparent mode, the security module is configured to:

generate a first temporal key for the first frequency band based on a first MAC address associated with the first frequency band, and
generate a second temporal key for the second frequency band based on a second MAC address associated with the second frequency band.

20. The network device of claim 19, wherein the third MAC module further comprises an encryption module configured to:
encrypt data to be transmitted via the first PHY module using the first temporal key, and
encrypt data to be transmitted via the second PHY module using the second temporal key.

21. The network device of claim 19, wherein the third MAC module includes the session transfer module configured to transfer the communication session from the first frequency band to the second frequency band, wherein the communication session resumes in the second frequency band using the second temporal key established prior to the network device switching operation from the first frequency band to the second frequency band.

* * * * *